(12) United States Patent
Ke et al.

(10) Patent No.: US 12,182,976 B2
(45) Date of Patent: Dec. 31, 2024

(54) IMAGE PROCESSING METHOD, SMART DEVICE, AND COMPUTER READABLE STORAGE MEDIUM

(71) Applicant: TENCENT TECHNOLOGY (SHENZHEN) COMPANY LIMITED, Shenzhen (CN)

(72) Inventors: Geyang Ke, Shenzhen (CN); Fei Huang, Shenzhen (CN); Wei Xiong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 350 days.

(21) Appl. No.: 17/711,852

(22) Filed: Apr. 1, 2022

(65) Prior Publication Data

US 2022/0222786 A1 Jul. 14, 2022

Related U.S. Application Data

(63) Continuation of application No. PCT/CN2021/077544, filed on Feb. 24, 2021.

(30) Foreign Application Priority Data

Apr. 15, 2020 (CN) .......................... 202010295743.1

(51) Int. Cl.
*G06T 5/77* (2024.01)
*G06T 3/4053* (2024.01)
(Continued)

(52) U.S. Cl.
CPC .............. *G06T 5/77* (2024.01); *G06T 3/4053* (2013.01); *G06T 5/50* (2013.01); *G06T 7/90* (2017.01);
(Continued)

(58) Field of Classification Search
CPC ... G06T 5/77; G06T 7/90; G06T 3/4053; G06T 5/50; G06T 2207/10024;
(Continued)

(56) References Cited

U.S. PATENT DOCUMENTS

| 8,107,764 B2 | 1/2012 | Kameyama et al. |
| 2002/0057444 A1 | 5/2002 | Ishikawa |
| 2019/0311223 A1* | 10/2019 | Wang ............... G06F 18/251 |

FOREIGN PATENT DOCUMENTS

| CN | 107424123 A | 12/2017 |
| CN | 108154487 A * | 6/2018 ............. G06T 5/002 |

(Continued)

OTHER PUBLICATIONS

Sun, Y., Yu, Y., & Wang, W. (2018). Moiré Photo Restoration Using Multiresolution Convolutional Neural Networks. IEEE Transactions on Image Processing, 27, 4160-4172. (Year: 2018).*

(Continued)

*Primary Examiner* — Utpal D Shah
*Assistant Examiner* — Jack Peter Kraynak
(74) *Attorney, Agent, or Firm* — Banner & Witcoff, Ltd.

(57) ABSTRACT

Methods, apparatuses and computer-readable storage mediums for processing images to remove moiré patterns. The method entails running an image processing model to perform moiré pattern removal processing on an original image to obtain a target image. The image processing model may include a network model trained according to a moiré pattern training data set. The image processing model can also include a multi-band module, which may be configured to process the original image to obtain an N-layer Laplacian pyramid of the original image, and obtain a first processing result feature map based on feature maps corresponding to N spatial frequency bands of the N-layer Laplacian pyramid, with N being a positive integer greater than or equal to 2.

(Continued)

US 12,182,976 B2

Page 2

The image processing model can include obtaining the target image according to the first processing result feature map.

18 Claims, 11 Drawing Sheets

(51) Int. Cl.
   *G06T 5/50*      (2006.01)
   *G06T 7/90*      (2017.01)
   *G06V 10/56*     (2022.01)
   *G06V 10/75*     (2022.01)
   *G06V 10/77*     (2022.01)
   *G06V 10/774*    (2022.01)
   *G06V 10/776*    (2022.01)

(52) U.S. Cl.
   CPC ............ *G06V 10/56* (2022.01); *G06V 10/751* (2022.01); *G06V 10/7715* (2022.01); *G06V 10/7747* (2022.01); *G06V 10/776* (2022.01); *G06T 2207/10024* (2013.01); *G06T 2207/20016* (2013.01); *G06T 2207/20081* (2013.01)

(58) Field of Classification Search
   CPC ........... G06T 2207/20081; G06T 2207/20016; G06V 10/7747; G06V 10/56; G06V 10/7715; G06V 10/751; G06V 10/776
   See application file for complete search history.

(56) References Cited

FOREIGN PATENT DOCUMENTS

| CN | 108389164 | A |   | 8/2018  |           |
|----|-----------|---|---|---------|-----------|
| CN | 108846818 | A |   | 11/2018 |           |
| CN | 109889800 | A | * | 6/2019  |           |
| CN | 110287969 | A |   | 9/2019  |           |
| CN | 110738609 | A | * | 1/2020  | G06K 9/4652 |
| CN | 111476737 | A |   | 7/2020  |           |

OTHER PUBLICATIONS

Tae-Hoon Kim and Sang Il Park. 2018. Deep context-aware descreening and rescreening of halftone images. ACM Trans. Graph. 37, 4, Article 48 (Aug. 2018), 12 pages (Year: 2018).*

Xi Cheng, Zhenyong Fu, Jian Yang, Improved multi-scale dynamic feature encoding network for image demoiréing, (2019), Pattern Recognition, vol. 116, 2021, 107970, ISSN 0031-3203 (Year: 2019).*

H. Yue, Y. Mao, L. Liang, H. Xu, C. Hou and J. Yang, (2020), "Recaptured Screen Image Demoiréing, " in IEEE Transactions on Circuits and Systems for Video Technology, vol. 31, No. 1, pp. 49-60, Jan. 2020 (Year: 2020).*

Q. Kang, Y. Fu and H. Huang, "Deep Color Image Demosaicking with Feature Pyramid Channel Attention," 2019 IEEE International Conference on Multimedia & Expo Workshops (ICMEW), Shanghai, China, 2019, pp. 246-251, doi: 10.1109/ICMEW.2019.00-79. (Year: 2019).*

W.-S. Lai, J.-B. Huang, N. Ahuja and M.-H. Yang, "Deep Laplacian Pyramid Networks for Fast and Accurate Super-Resolution," 2017 IEEE Conference on Computer Vision and Pattern Recognition (CVPR), Honolulu, HI, USA, 2017, pp. 5835-5843, doi: 10.1109/CVPR.2017.618. (Year: 2017).*

European Patent Office Extended European search report of Application No. 21789264.5-1210 Dec. 12, 2022 9 pages.

Yang et al., "Demoiréing for Screen-shot Images with Multi-channel Layer Decomposition", 2017 IEEE Visual Communications and Image Processing, Dec. 10, 2017 (Dec. 10, 2017), pp. 1-4.

Chen et al., "Multi-scale Dynamic Feature Encoding Network for Image Demoiréing", 2019 IEEE/CVF International Conference on Computer Vision Workshop, Oct. 27, 2019 (Oct. 27, 2019), pp. 3486-3493.

The State Intellectual Property Office of the People's Republic of China (SIPO) Office Action 1 for for 202010295743.1 Jul. 27, 2021 22 Pages (including translation).

The World Intellectual Property Organization (WIPO) International Search Report for PCT/CN2021/077544 May 28, 2021 5 Pages (including translation).

Yujing Sun et al., "Moiré Photo Restoration Using Multiresolution Convolutional Neural Networks," IEEE Transactions on Image Processing, vol. 27 Issue 8, Aug. 31, 2018 (Aug. 31, 2018). 13 pages.

Bolun Zheng et al., "Image Demoireing with Learnable Bandpass Filters," arXiv:2004.00406v1, Apr. 1, 2020 (Apr. 1, 2020). 10 pages.

Bolin Liu et al., "Demoiréing of Camera-Captured Screen Images Using Deep Convolutional Neural Network," arXiv:1804.03809v1, Apr. 11, 2018. 9 pages.

* cited by examiner

IMAGE PROCESSING METHOD, SMART DEVICE, AND COMPUTER READABLE STORAGE MEDIUM

RELATED APPLICATION(S)

This application is a continuation application of PCT Patent Application No. PCT/CN2021/077544 filed on Feb. 24, 2021, which claims priority to Chinese Patent Application No. 202010295743.1, entitled "IMAGE PROCESSING METHOD, SMART DEVICE, AND COMPUTER READABLE STORAGE MEDIUM" and filed with the China National Intellectual Property Administration on Apr. 15, 2020, all of which are incorporated herein by reference in entirety.

FIELD OF THE TECHNOLOGY

The present disclosure relates to the field of image processing technologies, and more particularly, to an image processing technology.

BACKGROUND

With the development of computer technologies and electronic imaging technologies, image applications, as a good auxiliary tool, have been applied to various scenarios of life, study, and work. Devices such as mobile phones and cameras can be used to not only photograph environmental images, but also photograph images displayed on various display screens. When mobile phones, digital cameras, and the like are used to photograph electronic display screens, an obtained image often has moiré patterns. The moiré patterns not only affect the viewing experience, but also adversely affect subsequent image recognition. Moreover, due to the moiré patterns, a lot of texture and noise are added to original image content, which increases the data volume of compressing the image.

In certain existing technologies for removing the moiré patterns, an edge extraction algorithm is used to determine a moiré pattern image part in an image based on a common shape of the moiré patterns and a shape difference between the moiré patterns and non-moiré pattern content in the image, to further remove the moiré patterns. However, the implementation of the algorithm in this manner is complex, and the moiré pattern removal effect is relatively poor.

SUMMARY

The present disclosure provides an image processing method, a smart device, and a computer-readable storage medium, which can remove moiré patterns in an image more conveniently and comprehensively.

In one aspect, the present disclosure provides an image processing method, including: obtaining an original image; and running an image processing model to perform moiré pattern removal processing on the original image to obtain a target image, the image processing model being a network model pre-trained according to a moiré pattern training data set, and the image processing model including a multi-band module, the multi-band module being configured to process the original image to obtain an N-layer Laplacian pyramid of the original image, and obtain a first processing result feature map based on feature maps corresponding to N spatial frequency bands of the N-layer Laplacian pyramid, the target image being obtained according to the first processing result feature map, and N being a positive integer greater than or equal to 2.

In another aspect, the present disclosure an image segmentation apparatus, the apparatus including: a memory storing computer program instructions; and a processor coupled to the memory and configured to execute the computer program instructions and perform: obtaining an original image; and running an image processing model to perform moiré pattern removal processing on the original image to obtain a target image, where the image processing model is a network model trained according to a moiré pattern training data set, and the image processing model includes a multi-band module, the multi-band module being configured to process the original image to obtain an N-layer Laplacian pyramid of the original image, and obtain a first processing result feature map based on feature maps corresponding to N spatial frequency bands of the N-layer Laplacian pyramid, the target image being obtained according to the first processing result feature map, and N being a positive integer greater than or equal to 2.

In yet another aspect, the present disclosure provides a non-transitory computer-readable storage medium storing computer program instructions executable by at least one processor to perform: obtaining an original image; and running an image processing model to perform moiré pattern removal processing on the original image to obtain a target image, where the image processing model is a network model trained according to a moiré pattern training data set, and the image processing model includes a multi-band module, the multi-band module being configured to process the original image to obtain an N-layer Laplacian pyramid of the original image, and obtain a first processing result feature map based on feature maps corresponding to N spatial frequency bands of the N-layer Laplacian pyramid, the target image being obtained according to the first processing result feature map, and N being a positive integer greater than or equal to 2.

According to the present disclosure, for the difference of moiré patterns in different scales and different spatial frequency bands, in the image processing model for removing moiré patterns, a multi-scale model constructed based on Laplacian pyramid is designed. By using the feature maps of the Laplacian pyramid in a plurality of frequency bands, an image processing model that can comprehensively remove moiré patterns in different scales and different frequency bands can be trained, and a better moiré pattern removal effect can be conveniently achieved.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
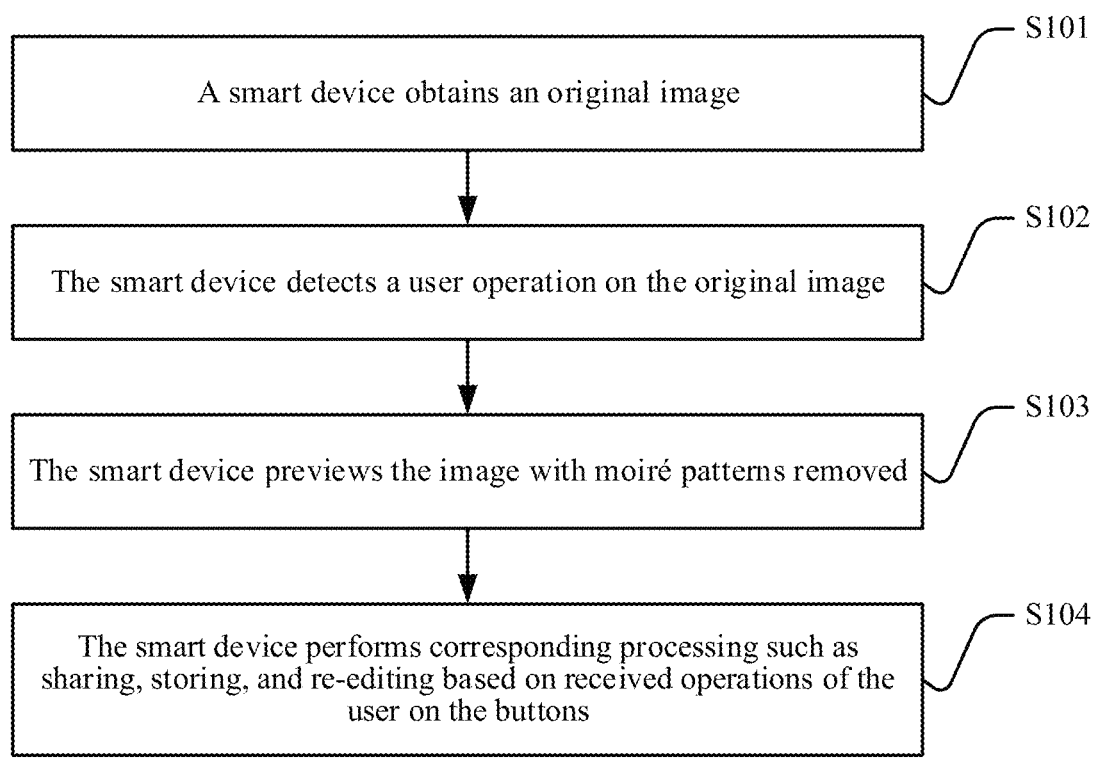
FIG. 1 is a schematic flowchart of utilizing a moiré pattern removal function according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Moiré patterns are fence-like texture generated based on the phenomenon of interference. If a spatial frequency of pixels of a photosensitive element (for example, a charge coupled device (CCD) sensor or complementary metal oxide semiconductor (CMOS) sensor) of an electronic device which may be a smart device with a photographing function such as a digital camera or a mobile phone is close to a spatial frequency of stripes in an image displayed on an electronic display screen, moiré patterns appear in a photographed image.

In the present disclosure, characteristics of moiré patterns are comprehensively analyzed. Based on the characteristics of the moiré patterns across spatial frequency bands and in a plurality of scales, a corresponding image processing model is designed, and a series of deep learning technologies are used, to eliminate the moiré patterns on images obtained by smart devices with a photographing function such as a smartphone or a digital camera when photographing electronic display screens, and restore the image quality as much as possible.

In certain embodiment(s), for an image processing model after training and adjustment, an image with moiré patterns is inputted, and moiré pattern removal processing is performed by using the image processing model to output a target image. The model design uses technologies such as sub-spatial frequency band supervision and multi-task learning; and an attention mechanism is used to restore a color and brightness distribution to achieve a better moiré pattern removal effect.

Further, the present disclosure provides a practical manner of manufacturing training data to facilitate model training based on manufactured training data, and uses training adjustment manners such as self-supervised learning, multi-scale learning, and generative adversarial networks in the training process.

To implement the functions, a target application may be designed and installed in a smart device. In one aspect, the target application may call a camera of the smart device to photograph images. In another aspect, the target application may read images stored locally or download images from the network. In addition, the photographed images with moiré patterns, and the read or downloaded images with moiré patterns may be directly displayed to a user. After the images are displayed to the user, moiré pattern removal processing may be determined according to a user operation, and image with moiré patterns removed are then displayed. Moiré pattern removal processing may be alternatively performed in the background automatically before the images are displayed to the user, to display a processed target image without moiré patterns to the user.

There are various application scenarios for removing moiré patterns. For example, in a scenario of user communication, when user A shares information such as PPT on the personal computer with user B through a communication application, user A may photograph the personal computer screen by using a smart device such as a smartphone running the communication application. In this implementation, an image with moiré patterns is obtained. For such images with moiré patterns, user A may directly enable a moiré pattern removal function. In this way, images such as PPT shared by user A with user B and obtained by photographing the personal computer display screen using the smartphone are all images with moiré patterns removed. In this way, the amount of video coding data generated due to the moiré patterns can be reduced, the quality of image data transmission can be ensured, and it is convenient for user B to see the photographed image information more clearly. Further, user B can directly store clear image information transmitted through video communication, or convert the image information into data such as editable documents.

FIG. 1 is a schematic flowchart of utilizing a moiré pattern removal function according to an embodiment of the present disclosure. The process further includes the following steps:

S101: A smart device obtains an original image.

The user may control the smart device, to cause the smart device to obtain an image with moiré patterns. For example, the user may directly photograph an electronic display screen to obtain an image with moiré patterns, and the image with moiré patterns may be referred to as an original image.

In some embodiments, the smart device may alternatively read an image with moiré patterns from the local, or download an image with moiré patterns from the network to obtain the original image.

S102: The smart device detects a user operation on the original image.

After obtaining the original image with moiré patterns, the smart device may display a button for whether to enable moiré pattern removal on a display interface for displaying the original image, to detect the user operation on the original image. When such images with moiré patterns are displayed on the display interface, the button for whether to enable moiré pattern removal may also be displayed. In this way, a one-click moiré pattern removal function may be provided for the original images obtained in different manners.

S103: The smart device previews the image with moiré patterns removed.

After the background of the smart device performs the image processing for moiré pattern removal, the smart device may preview and display the image with moiré patterns removed, and the image with moiré patterns removed is referred to as a target image. Other function buttons such as buttons for sharing, saving, and re-editing may also be displayed on the interface for previewing and displaying the target image.

S104: The smart device performs corresponding processing such as sharing, storing, and re-editing based on received operations of the user on the buttons.

Figure 2:
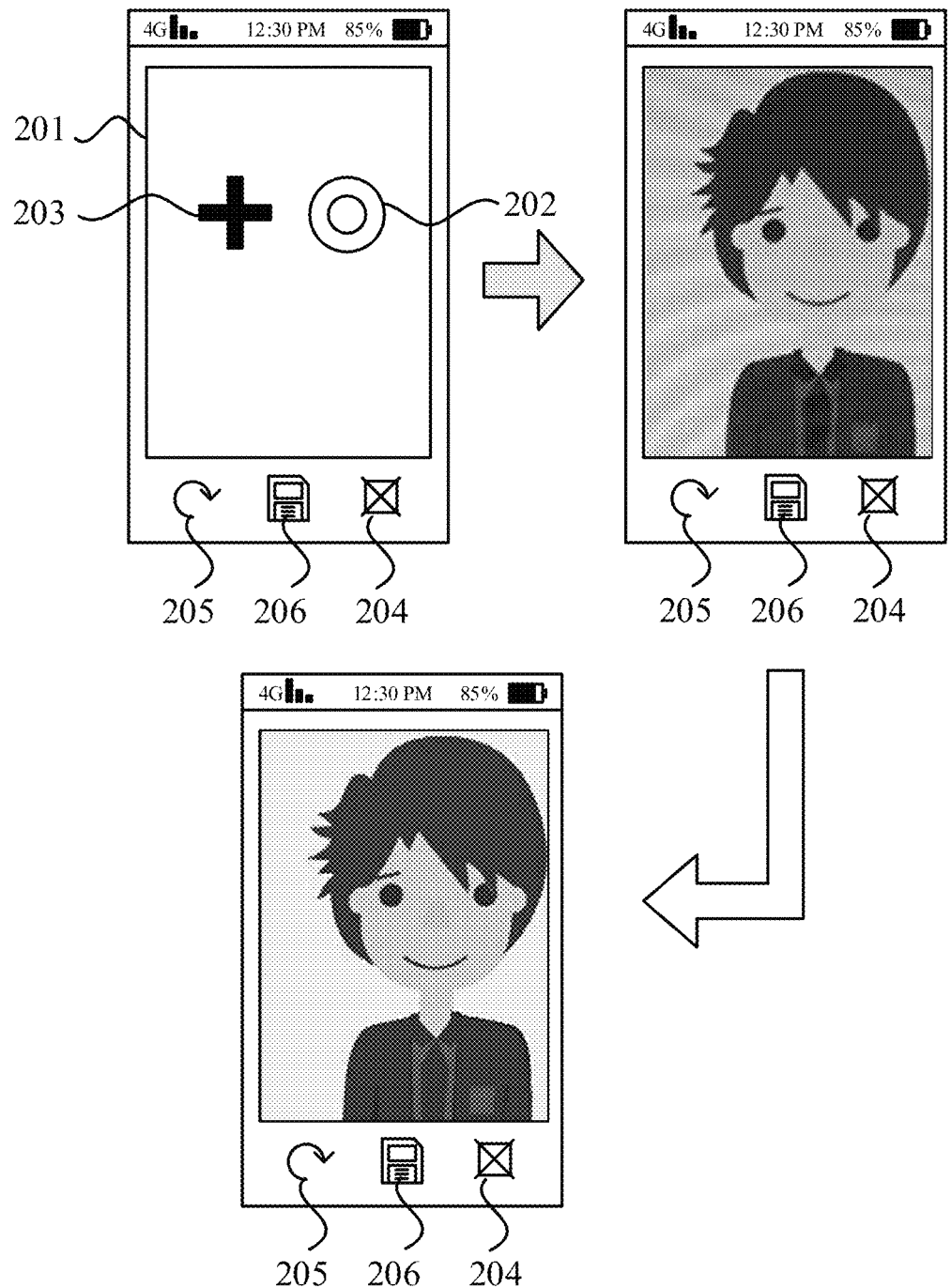
FIG. 2 shows a schematic interface of one of image processing applications according to embodiment(s) of the present disclosure.

In an embodiment, FIG. 2 shows a related application interface of one of image processing applications in an embodiment of the present disclosure. The image processing application includes a series of schematic interface diagrams displayed to the user from obtaining an image with moiré patterns to removing the moiré patterns. After the user clicks an application icon, the image processing application is run, and the user may trigger an operation of obtaining the original image in an application interface 201. In certain embodiment(s), the user may choose to trigger a photographing button 202 to photograph an image, or may choose to trigger a loading button 203 to extract an image or from the local or the network, thereby obtaining the original image.

The obtained original image may be displayed on the application interface 201. If there are moiré patterns, a remove button 204 may be displayed. When the user clicks the remove button 204, a target application may perform image processing to obtain a target image with moiré patterns removed, and the target image with moiré patterns removed is displayed on the application interface 201.

In an embodiment, based on the image processing application, the smart device may analyze the obtained image displayed on the application interface, and display the remove button 204 only when determining through analysis that there are moiré patterns on the image. The remove button 204 may be alternatively displayed on the application interface 201 after the original image is obtained. Other buttons are also shown in FIG. 2, such as a button 205 that triggers re-obtaining of an image and a button 206 that triggers storage of an image.

Figure 3:
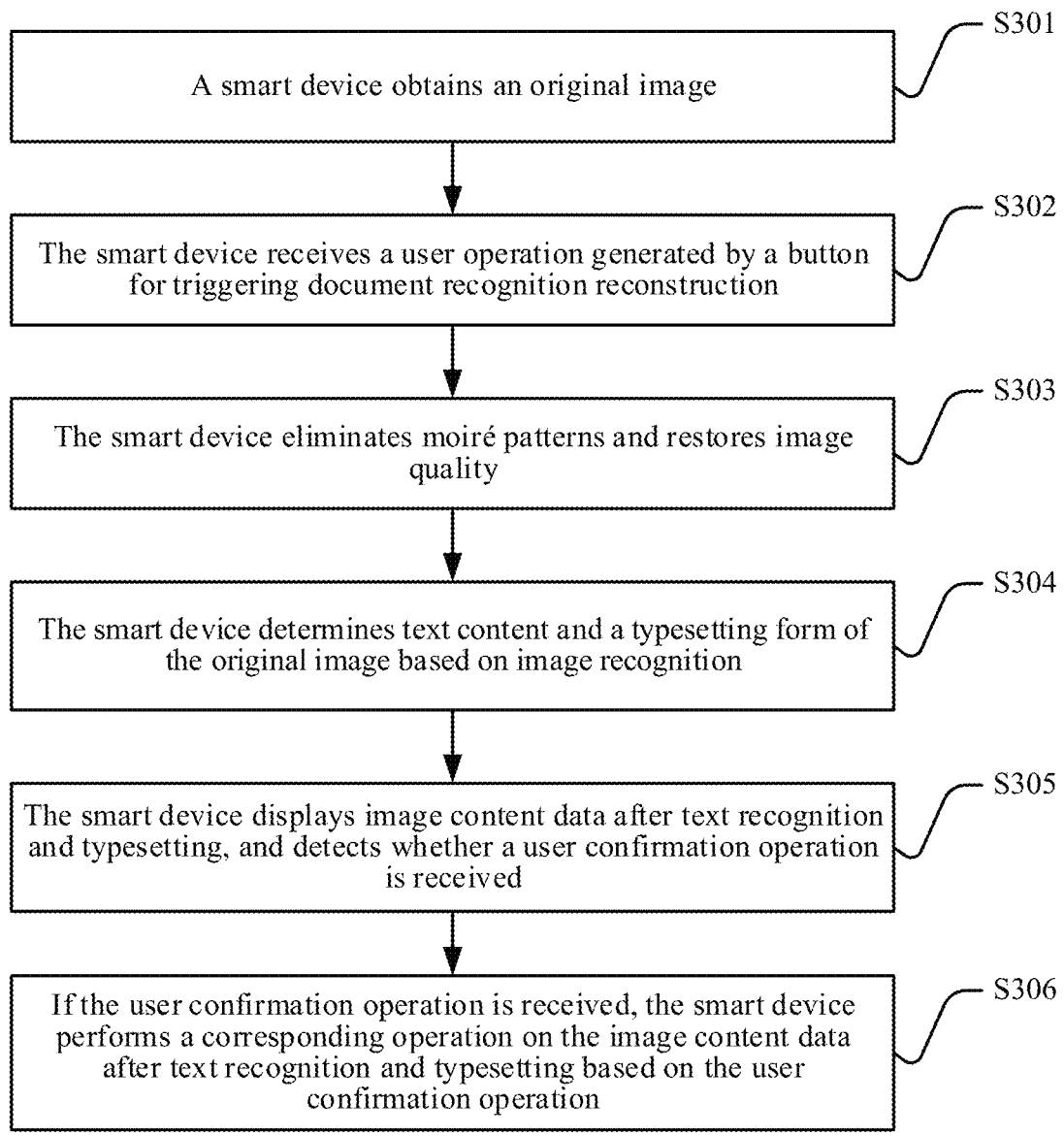
FIG. 3 is a schematic flowchart of utilizing a moiré pattern removal function according to embodiment(s) of the present disclosure.

In an embodiment, the image processing method of the present disclosure may be further used to remove moiré patterns in a scenario of converting an image into an editable document. FIG. 3 is another schematic flowchart of utilizing a moiré pattern removal function according to an embodiment of the present disclosure. The process may include the following steps:

S301: A smart device obtains an original image.

The smart device is deployed with an image-to-text conversion application that has a moiré pattern removal function. The image-to-text conversion application refers to an application that converts an image (for example, a photographed slideshow image) into an editable document. The smart device may start the image-to-text conversion application in response to an operation of the user clicking an icon of the image-to-text conversion application. The smart device may then obtain the original image according to a user operation, for example, photographing PPT displayed on a computer screen to obtain the original image, or extracting the original image with moiré patterns from the local.

S302: The smart device receives a user operation generated by a button for triggering document recognition reconstruction.

S303: The smart device performs the image processing method of the present disclosure to eliminate moiré patterns and restore image quality.

S304: The smart device determines text content and a typesetting form of the original image based on image recognition.

In an embodiment, the smart device may determine the text content and the typesetting form of the original image based on optical character recognition (OCR).

S305: The smart device displays image content data after text recognition and typesetting, and detects whether a user confirmation operation is received.

S306: If the user confirmation operation is received, the smart device performs a corresponding operation on the image content data after text recognition and typesetting based on the user confirmation operation.

In an embodiment, the smart device may import the image content data after text recognition and typesetting into a shared document based on the user confirmation operation, or store the image content data in a local storage in the form of a document. In some other embodiments, the smart device may further receive an editing operation of the user, to edit the displayed image content data after text recognition and typesetting, for example, supplementing or modifying text that is not correctly recognized, adding a picture that is not correctly recognized, and the like.

The image processing method for removing moiré patterns in the present disclosure is described below.

Figure 4:
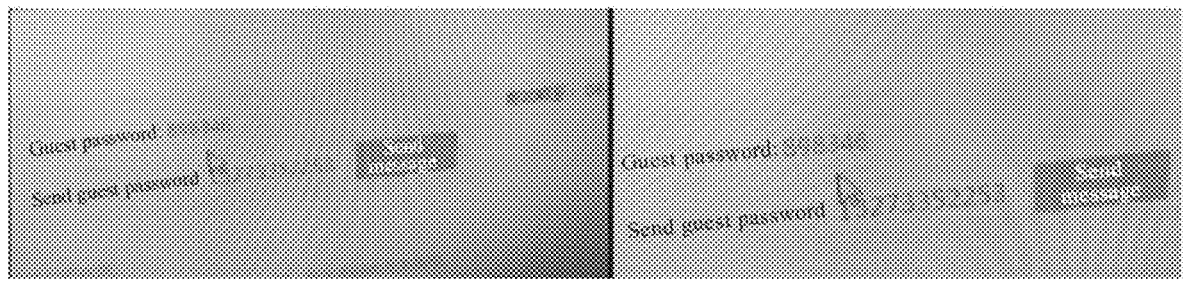
FIG. 4 is a schematic diagram of moiré patterns in different scales according to embodiment(s) of the present disclosure.

After research on images with moiré patterns, it is found that moiré patterns have multi-scale and multi-spatial frequency band characteristics. In one aspect, the same image has different shapes of moiré patterns in different scales. For example, the same image with moiré patterns has different expressions of moiré pattern in scales such as 256×256, 384×384, and 512×512. FIG. 4 is a local display of the same image scaled to different scales. The shapes of the moiré patterns are different. The data distribution of the moiré patterns in each scale has uniqueness. An image processing model to reduce moiré patterns is to be capable of dealing with moiré patterns of various scales and shapes. In FIG. 4, the resolution of the image on the right is larger than that of the image on the left. It may be simply considered that after the image on the left is enlarged, the moiré patterns are not the same. For example, for the part of the image near "send message", the "send message" of the image on the left has scattered stripes below and dense stripes above, while the "send message" of the image on the right has dense stripes below and scattered stripes above. In addition, the stripes are of different thicknesses.

Figure 5:
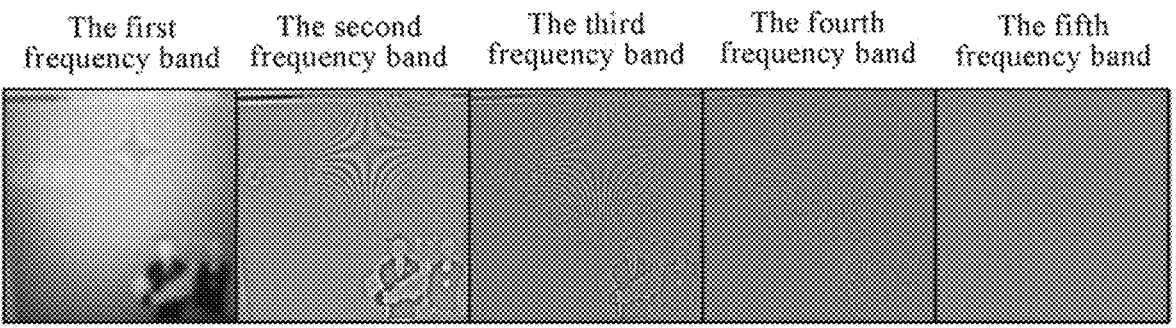
FIG. 5 is a schematic diagram of moiré patterns in different spatial frequency bands according to embodiment(s) of the present disclosure.

In another aspect, in the same image, the moiré patterns have different shapes in different spatial frequency bands. If the Laplacian pyramid is used to decompose the moiré patterns into a plurality of spatial frequency bands, it is found that the moiré patterns have different shapes in each spatial frequency band. As shown in FIG. 5, in five spatial frequency bands corresponding to the Laplacian pyramid, the moiré patterns have different shapes. In certain embodiment(s), not each spatial frequency band has traces of moiré patterns. As can be seen from FIG. 5, a data distribution of moiré patterns in each spatial frequency band is different. Low frequencies tend to show thick color cast stripes, and high frequencies tend to show gray fine lines. When designing an image processing model, the present disclosure can take advantage of this multi-spatial frequency band difference to reduce moiré patterns in each spatial frequency band in a targeted manner.

In certain embodiment(s), the FIG. 4 and FIG. 5 are only used to illustrate the two characteristics of moiré patterns. FIG. 4 and FIG. 5 are only used to illustrate the shapes of the moiré patterns, and other image content outside the moiré patterns in FIG. 4 and FIG. 5 is meaningless.

Figure 6:
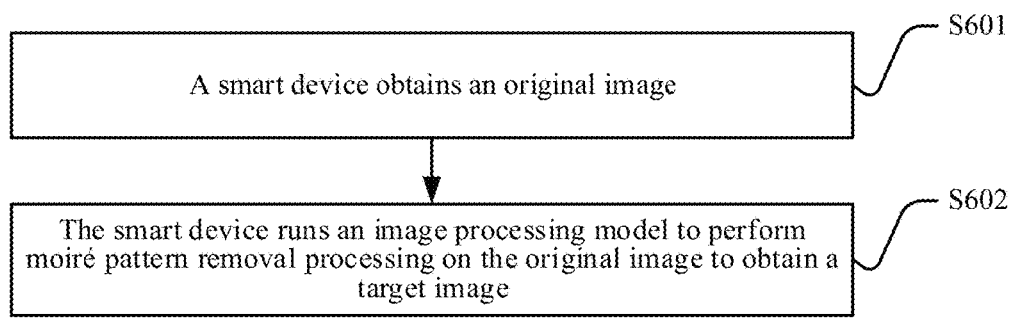
FIG. 6 is a schematic flowchart of an image processing method according to embodiment(s) of the present disclosure.

In an embodiment, FIG. 6 is a schematic flowchart of an image processing method according to an embodiment of the present disclosure. This embodiment of the present disclosure may be performed by smart devices such as smartphones, tablet computers, personal computers, and even servers, and uses an image processing model constructed, trained, and adjusted based on the moiré pattern features determined in the research above. The special image processing model is used to achieve the removal of moiré patterns. In certain embodiment(s), the method of this embodiment of the present disclosure includes the following steps:

S601: A smart device obtains an original image.

As described above, the original image may be an image with moiré patterns obtained when content displayed on an electronic display screen is photographed, or an image with moiré patterns obtained from the local or the network. The user obtains the original image that may be processed by running a related application, to obtain a clearer image without moiré patterns, a document that can be edited and shared, and the like.

S602: The smart device runs an image processing model to perform moiré pattern removal processing on the original image to obtain a target image, the image processing model being a network model pre-trained according to a moiré pattern training data set, and the image processing model including a multi-band module, the multi-band module being configured to process the original image to obtain an N-layer Laplacian pyramid of the original image, and obtain a first processing result feature map based on feature maps corresponding to N spatial frequency bands of the N-layer Laplacian pyramid, the target image being obtained according to the first processing result feature map, and N being a positive integer greater than or equal to 2.

In certain embodiment(s), the term "pre-trained" is interchangeable with the term "trained."

In certain embodiment(s), the term "pre-trained" refers to that the network mode is trained in advance of one or more other steps in the method.

Figure 7:
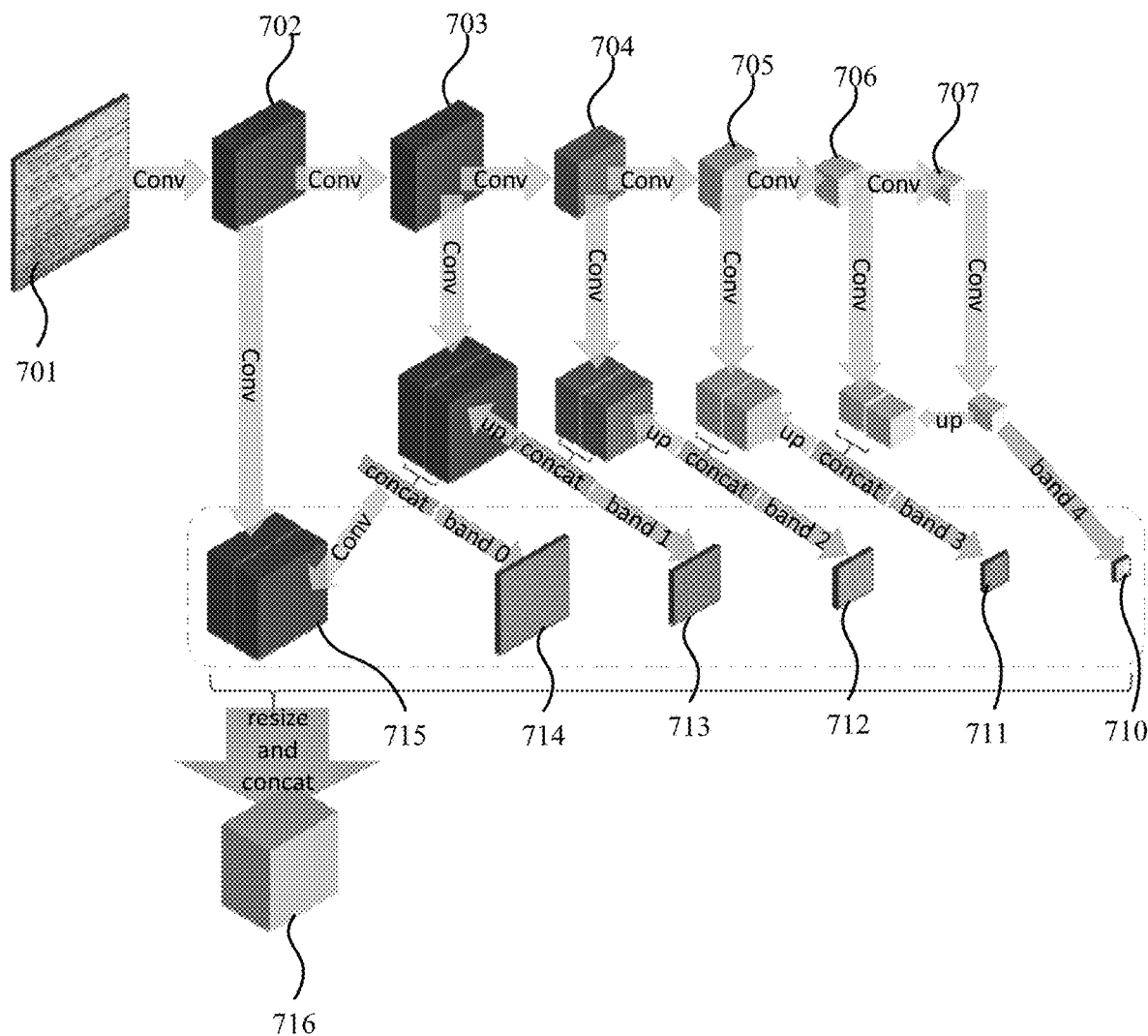
FIG. 7 is a schematic structural diagram of an image processing model according to embodiment(s) of the present disclosure.

The structure of the image processing model in this embodiment of the present disclosure is shown in FIG. 7. In one aspect, the Laplacian pyramid is provided, to obtain the feature maps of the plurality of spatial frequency bands corresponding to the original image. In another aspect, the feature maps of the plurality of spatial frequency bands further reflect feature maps of the original image in different scales. The shapes of the moiré patterns in different spatial frequency bands and different scales are considered in the image processing model. In certain embodiment(s), the Laplacian pyramid is introduced to the image processing model. Based on a supervised or self-supervised model training manner, an image processing model suitable for removing moiré patterns is then obtained. Compared with a certain existing model constructed based on an edge extraction technology, the image processing model can remove moiré patterns in an image more conveniently and comprehensively.

As shown in FIG. 7, in the image processing model of this embodiment of the present disclosure, for an original image 701, M=6 times of initial analysis processing is first performed on the original image 701, to obtain initial feature maps in N=5 scales corresponding to the original image. In this embodiment of the present disclosure, the Laplacian pyramid has five layers. Therefore, the M=6 times of initial analysis processing may include: performing down-scaled convolution processing or down-sampling post-convolution processing on the original image 701 of an original scale to obtain an initial feature map 702 of ½ scale; directly performing convolution processing on the initial feature map 702 of ½ scale to obtain an initial feature map 703 of ½ scale, where in some embodiments, the directly performing convolution processing on the initial feature map 702 of ½ scale to obtain an initial feature map 703 of ½ scale is an optional step; performing down-scaled convolution processing or down-sampling post-convolution processing on the initial feature map 703 of ½ scale to obtain an initial feature map 704 of ¼ scale, where when the initial feature map 703 does not exist, related processing may be performed directly on the initial feature map 702 of ½ scale to obtain the initial feature map 704 of ¼ scale; performing down-scaled convolution processing or down-sampling post-convolution processing on the initial feature map 704 of ¼ scale to obtain an initial feature map 705 of ⅛ scale; performing down-scaled convolution processing or down-sampling post-convolution processing on the initial feature map 705 of ⅛ scale to obtain an initial feature map 706 of 1/16 scale; and performing down-scaled convolution processing or down-sampling post-convolution processing on the initial feature map 706 of 1/16 scale to obtain an initial feature map 707 of 1/32 scale.

In certain embodiment(s), M=6 and N=5 are only examples, and in some other embodiments, M=N or M>N, and M and N are other integer values.

After the initial feature maps of scales are obtained, intermediate feature convolution process is respectively performed on the initial feature maps to obtain the corresponding intermediate feature maps in N scales. Up-sampling convolution is then performed layer by layer starting from an intermediate feature map corresponding to the initial feature map 707 of 1/32 scale, an up-sampling convolution result and an intermediate feature map of the same scale are concatenated, up-sampling convolution is performed on a concatenated result, and the concatenation process is repeated until a Laplacian pyramid including five feature maps in different spatial frequency bands and different scales is generated.

In FIG. 7, the feature maps corresponding to the N spatial frequency bands included in the Laplacian pyramid include: a feature map 710 corresponding to the fifth spatial frequency band (band4 in FIG. 7), a feature map 711 corresponding to the fourth spatial frequency band (band3 in FIG. 7), a feature map 712 corresponding to the third spatial frequency band (band2 in FIG. 7), a feature map 713 corresponding to the second spatial frequency band (band1 in FIG. 7), and a feature map 714 corresponding to the first spatial frequency band (band0 in FIG. 7). In this embodiment of the present disclosure, the fifth spatial frequency band is the top layer of the Laplacian pyramid.

The concatenation described in the present disclosure is an operation in the network structure design of the image processing model, which is used to combine features, and may refer to fusing features extracted by a plurality of convolutional feature extraction frameworks, or fusing information of an output layer. In some other embodiments, the concatenation involved in the present disclosure may be alternatively replaced by adding processing, and the adding processing may be, in short, direct superposition between information.

In an embodiment, size adjustment and concatenation may be performed on the feature maps corresponding to the N spatial frequency bands to obtain a first processing result feature map 716. Alternatively, size adjustment and concatenation may be performed on the feature maps corresponding to the N spatial frequency bands and a predicted feature map 715 to obtain the first processing result feature map 716.

In the training phase of the image processing model, for a training image with moiré patterns and a supervision image corresponding to the training image (the supervision image has no moiré pattern), in one aspect, the training image is inputted into the image processing model shown in FIG. 7, to obtain predicted model feature maps of N (for example, 5) spatial frequency bands corresponding to an N-layer (for example, 5) Laplacian pyramid. In another aspect, Laplacian pyramid processing is directly performed on the supervision image to obtain supervision feature maps of N (for example, 5) spatial frequency bands, loss function values between the predicted model feature maps of N (for example, 5) spatial frequency bands and the supervision feature maps of N (for example, 5) spatial frequency bands are calculated, and relevant convolution parameters in each convolution process shown in FIG. 7 are adjusted, so that the calculated N (for example, 5) loss function values are the smallest. Based on the training of a large quantity of training images and supervision images, an image processing model that takes into account the scale and spatial frequency band characteristics of moiré patterns can be obtained, and the obtained image processing model can remove moiré patterns in images more conveniently and comprehensively.

In some other embodiments, based on each layer of feature map of the Laplacian pyramid, the corresponding image can be restored. The image processing model shown in FIG. 7 performs size adjustment and concatenation on the feature maps (based on the feature maps corresponding to the five layers of spatial frequency bands of the Laplacian pyramid) corresponding to the spatial frequency bands of the Laplacian pyramid corresponding to the training image, or on the feature maps corresponding to the spatial frequency bands of the Laplacian pyramid corresponding to the training image and the predicted feature map corresponding to the training image, to obtain the target image with moiré patterns removed. In this embodiment, a loss function value between the target image and the supervision image corresponding to the training image is directly calculated, and relevant convolution parameters in each convolution process shown in FIG. 7 are adjusted, so that the calculated loss function value is the smallest. Based on the training of a large quantity of training images and supervision images, an image processing model that takes into account the scale and spatial frequency band characteristics of moiré patterns can be obtained, and the obtained image processing model can remove moiré patterns more conveniently and comprehensively.

In the stage of using the image processing model to recognize the original image, the original image to be processed is directly used as the input of the image processing model. After the parameters are adjusted for convolution and sampling, a target image after moiré pattern removal processing in a plurality of spatial frequency bands and scales is finally outputted.

According to the embodiments of the present disclosure, for the difference of moiré patterns in different scales and different spatial frequency bands, in the image processing model for removing moiré patterns, a multi-band module constructed based on Laplacian pyramid is designed. By using the feature maps of the Laplacian pyramid in a plurality of frequency bands, an image processing model that can comprehensively remove moiré patterns in different scales and different frequency bands can be trained, and a better moiré pattern removal effect can be conveniently achieved.

In another embodiment, based on the moiré pattern characteristics considered in the establishment of the image processing model, the moiré patterns in the image can be removed well. Further, after research, it is further found that if the original image is blurred, the moiré patterns in some flat regions can be removed. Therefore, these flat regions can be directly used to form the final result, without the need for the network to learn this capability. For an image with moiré patterns, when the lighting environment is not ideal, and the brightness of the image is often unbalanced. If the illumination can be expressed explicitly, the model can pay more attention to how to reduce the moiré patterns. Based on this, the image processing method according to this embodiment of the present disclosure is further described below with reference to FIG. 8 and FIG. 9.

Figure 8:
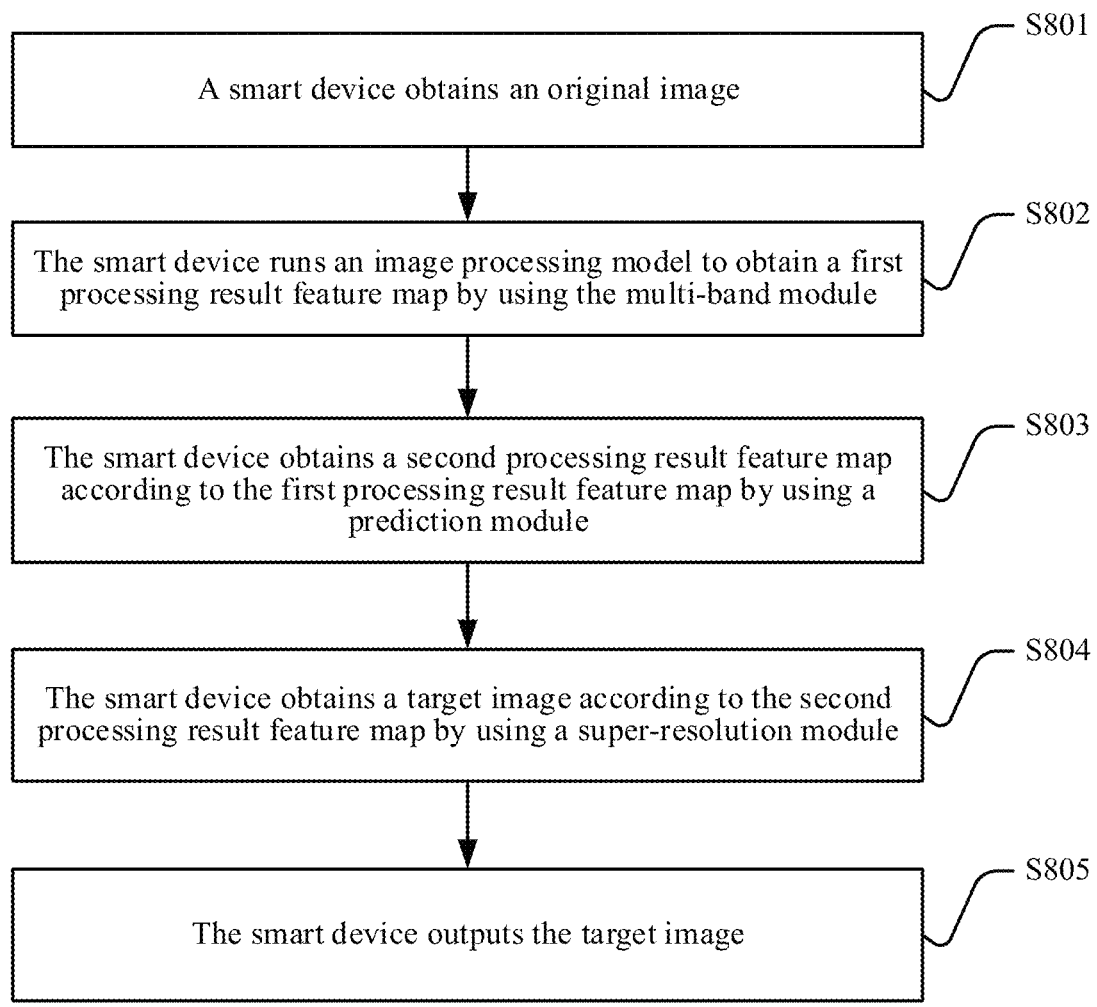
FIG. 8 is a schematic flowchart of another image processing method according to embodiment(s) of the present disclosure.

FIG. 8 is a schematic flowchart of another image processing method according to an embodiment of the present disclosure. The method of this embodiment of the present disclosure may be implemented by smart devices such as smartphones, tablet computers, and personal computers, and the method includes the following steps:

S801: A smart device obtains an original image.

After obtaining the original image, the smart device may run an image processing model to perform moiré pattern removal processing on the original image to obtain a target image. The specific process may include descriptions of the following steps.

Figure 9:
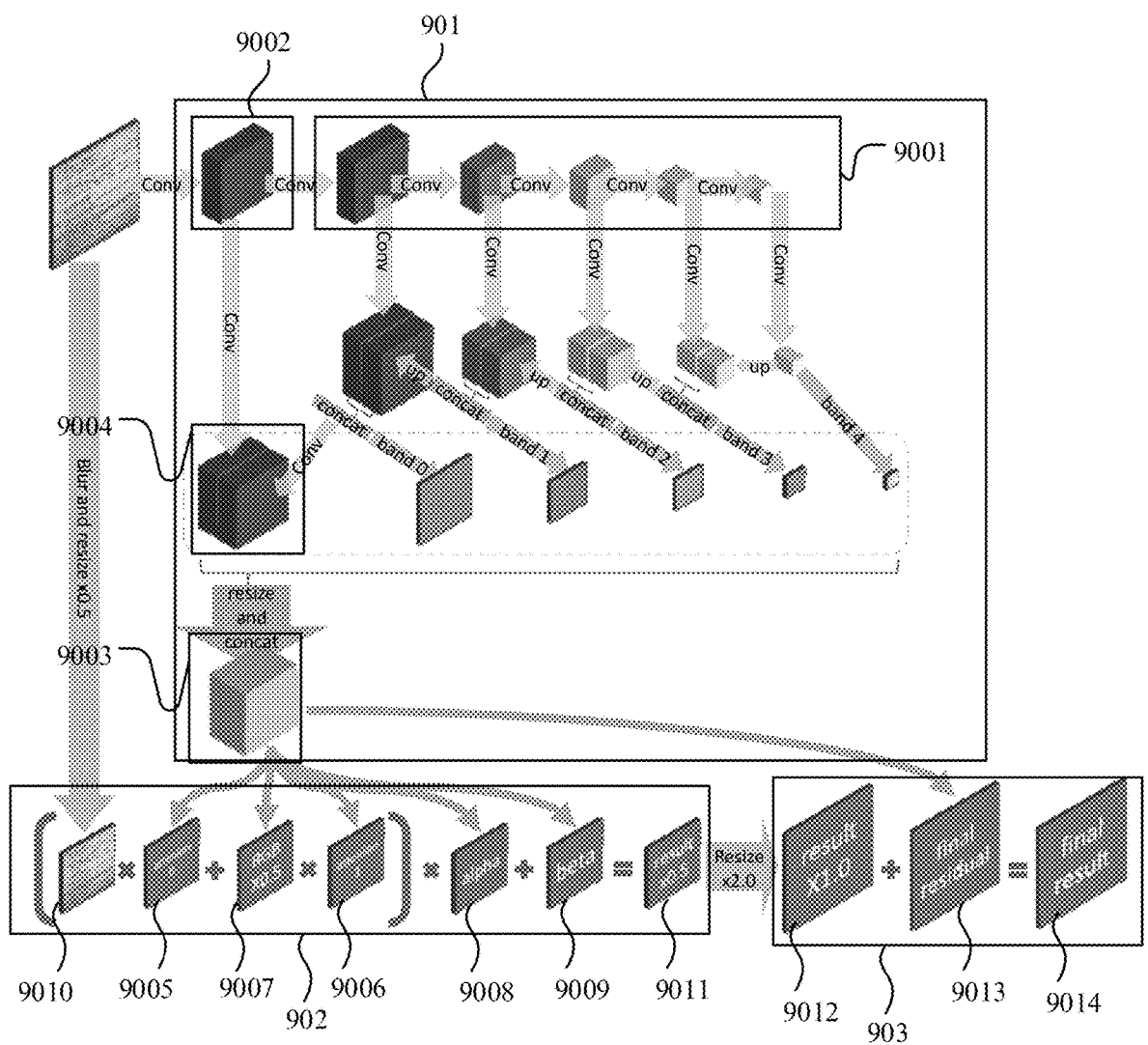
FIG. 9 is a schematic structural diagram of another image processing model according to embodiment(s) of the present disclosure.

In this embodiment of the present disclosure, as shown in FIG. 9, the image processing model includes: a multi-band module 901, a prediction module 902, and a super-resolution module 903. In the training process of the image processing model, a training processing result of the multi-band module 901, a training processing result of the prediction module 902, and a training processing result of the super-resolution module 903 may be combined to comprehensively calculate a loss function value, to adjust relevant model parameters in the multi-band module 901, the prediction module 902, and the super-resolution module 903, and minimize the loss function value obtained through the comprehensive calculation. Only a loss function value corresponding to the training result finally outputted by the super-resolution module 903 may be alternatively calculated, to adjust relevant model parameters in the multi-band module 901, the prediction module 902, and the super-resolution module 903, and minimize the loss function value calculated according to the output result of the super-resolution module 903.

S802: The smart device runs an image processing model to obtain a first processing result feature map by using the multi-band module.

The multi-band module 901 is constructed based on the Laplacian pyramid. In an embodiment, S802 may include the following steps:

S8021: The smart device runs the image processing model to perform M times of initial analysis processing on the original image by using the multi-band module 901, to obtain initial feature maps in N scales, M being a positive integer greater than or equal to 2. The initial analysis processing includes: first down-sampling and then performing convolution processing on the original image, or performing down-scaled convolution processing on the original image. M is greater than or equal to N, and both M and N are positive integers. The initial feature maps in N scales are content of a region 9001 shown in FIG. 9. In this embodiment of the present disclosure, M is greater than N, and is M=N+1. Therefore, after M times of initial analysis processing, a feature map of ½ scale is further obtained, which is content of a region 9002 shown in FIG. 9.

S8022: The smart device performs convolution processing on the initial feature maps in N scales to obtain intermediate feature maps in N scales. The intermediate feature maps in N scales are five feature maps pointed to by conv arrows pointing downward from the initial feature maps in FIG. 9.

S8023: The smart device obtains the feature maps corresponding to the N spatial frequency bands of the N-layer Laplacian pyramid according to the intermediate feature maps in N scales. In the feature maps corresponding to the N spatial frequency bands, a feature map of an $N^{th}$ spatial frequency band is obtained according to an $N^{th}$ intermediate feature map with a smallest scale in the intermediate feature maps; and in the feature maps corresponding to the N spatial frequency bands, a feature map of an $(N-i)^{th}$ spatial frequency band is obtained according to the $N^{th}$ intermediate feature map, an $(N-i)^{th}$ intermediate feature map, and all intermediate feature maps between the $N^{th}$ intermediate feature map and the $(N-i)^{th}$ intermediate feature map, i being a positive integer greater than or equal to 1 and less than N.

Taking FIG. 9 as an example, an intermediate feature map with the smallest scale is used as a feature map corresponding to a fifth spatial frequency band. A feature map corresponding to the $(5-1)^{th}$ (that is, i=1)=4 spatial frequency band is obtained after concatenation based on the $(5-1=4)^{th}$ intermediate feature map and a feature map obtained by performing up-sampling convolution on the fifth intermediate feature map. A feature map corresponding to the $(5-2)^{th}$ (that is, i=2)=3 spatial frequency band is obtained according to the third intermediate feature map, the fourth intermediate feature map, and the fifth intermediate feature map. In certain embodiment(s), a feature map obtained by performing up-sampling convolution on the fifth intermediate feature map is concatenated with the fourth intermediate feature map, and a feature map obtained by performing up-sampling convolution on the feature map after the concatenation is then concatenated with the third intermediate feature map, to obtain the feature map corresponding to the third spatial frequency band, and so on.

S8024: The smart device obtains the first processing result feature map according to the feature maps corresponding to the N spatial frequency bands. After obtaining the feature maps corresponding to the N spatial frequency bands, the smart device may directly perform scale adjustment and concatenation based on the feature maps corresponding to the spatial frequency bands to obtain a large feature map, which is recorded as the first processing result feature map.

In an embodiment, S8024 may further include: obtaining, by the smart device, a predicted feature map, the predicted feature map being obtained according to an Nth intermediate feature map, a 1st intermediate feature map, and all intermediate feature maps between the Nth intermediate feature map and the 1st intermediate feature map. As shown in FIG. 9, the predicted feature map is obtained by concatenating two feature maps in a region 9004 in FIG. 9. One of the two feature maps is an intermediate feature map obtained through convolution of the initial feature map 9002, and the other is a feature map obtained after up-sampling convolution and concatenation from the fifth intermediate feature map. Size adjustment is performed on feature maps whose scales are smaller than a scale of the predicted feature map in the feature maps corresponding to the N spatial frequency bands, so that scales of the adjusted feature maps corresponding to the spatial frequency bands are equal to the scale of the predicted feature map; and the first processing result feature map is obtained according to the predicted feature map and the adjusted feature maps corresponding to the spatial frequency bands. After direct size adjustment, the feature maps corresponding to the N spatial frequency bands are then concatenated with the predicted feature map to obtain a large feature map, which is recorded as the first processing result feature map. The large feature map is a feature map 9003 shown in FIG. 9. The outputs of the five frequency bands are multiplexed, which is because such outputs are theoretically linear with the final output, and are high-level features with abundant information.

After obtaining the feature maps corresponding to the N spatial frequency bands, the smart device may obtain a target image according to the feature maps corresponding to the N spatial frequency bands, or obtain a target image according to the first processing result feature map. The smart device may alternatively directly obtain the target image based on the first processing result feature map. In certain embodiment(s), the following steps may be performed to obtain the target image according to the first processing result feature map.

S803: The smart device obtains a second processing result feature map according to the first processing result feature map by using a prediction module.

The prediction module is constructed based on the attention mechanism, and S803 may further include the following steps:

S8031: The smart device obtains a blurred feature map obtained by blurring the original image.

S8032: The smart device obtains a second processing result feature map according to the first processing result feature map and the blurred feature map by using the prediction module.

The blurring may be Gaussian blurring.

As shown in FIG. 9, the prediction module constructed based on the attention mechanism predicts, starting from the first processing result feature map, a plurality of RGB three-channel feature map through the network. In some implementations, the plurality of RGB three-channel feature maps include a pixel-wise weighted parameter feature map attention0 (for example, a feature map 9005 in FIG. 9), a pixel-wise weighted parameter feature map attention1 (for example, a feature map 9006 in FIG. 9), an RGB output feature map (for example, a feature map 9007 in FIG. 9), an illumination multiplication coefficient feature map alpha (for example, a feature map 9008 in FIG. 9), and an illumination addition coefficient feature map beta (for example, a feature map 9009 in FIG. 9).

In an embodiment, a result feature map is RGBweighted=attention0*blured+attention1*RGB. The blurred is a blurred feature map 9010 obtained by blurring the original image. In the image processing model shown in FIG. 9, the blurred feature map 9010 is a feature map obtained by blurring and the original image and adjusting the size, and the size of the blurred feature map is the same as that of the first processing result feature map. In an embodiment, the pixel-wise weighted parameter feature map attention0, the pixel-wise weighted parameter feature map attention1, and the RGB output feature map are obtained after convolution calculation respectively according to the first processing result feature map.

Based on the feature map RGBweighted, a lighting coefficient is used to reduce inappropriate brightness and darkness changes: feature map result=RGBweighted*alpha+beta. alpha and beta are also obtained after convolution calculation according to the first processing result feature map.

For attention0, attention1, the RGB output feature map, alpha, and beta, during model training, convolution parameters of the convolution calculation from the first processing result feature map to such feature maps are adjusted according to a large quantity of loss function values, to obtain appropriate convolution parameters, and further obtain, from output results of the multi-band module, appropriate attention0, attention1, RGB output feature map, alpha, and beta that may be used to help reduce moiré patterns and restore the original image quality.

A feature map result 9011 is a second processing result feature map, from which a moiré pattern removal result in ½ scale is obtained, and the illumination change is additionally restored.

After the second processing result feature map is obtained, the target image may be obtained according to the second processing result feature map. In certain embodiment(s), the following super-resolution processing may be further performed to obtain the final target image. In an embodiment, the target image may be directly obtained according to the second processing result feature map, without the super-resolution processing by the super-resolution module.

S804: The smart device obtains a target image according to the second processing result feature map by using a super-resolution module.

S804 further includes: obtaining, by the smart device, a reference feature map according to the first processing result feature map, and obtain an intermediate result feature map by processing the second processing result feature map, a scale of the reference feature map being the same as a scale of the original image, and a scale of the intermediate result feature map being the same as the scale of the original image. The smart device obtains the target image according to the reference feature map and the intermediate result feature map by using the super-resolution module 903.

After obtaining the second processing result feature map, the smart device then performs a simple super-resolution up-sampling on the second processing result feature map of ½ scale to obtain a final result. In an embodiment, the result of ½ scale is first enlarged twice to obtain an RGB image at the original resolution, which is denoted as result 1.0, that is, 9012, where result 1.0 represents a feature map after the second processing result feature map is enlarged twice. Starting from the first processing result feature map, a convolution prediction residual value final_residual, that is, 9013 is used, where final_residual also represents a feature map. The final result is a feature map 9014 of the target image that may be outputted, the feature map 9014 of the target image may be recorded as final_result=result 1.0+final_residual, so that the super-resolution is performed. Based on the feature map of the target image after the super-resolution, the target image may be restored.

S805: The smart device outputs the target image.

In certain embodiment(s), the smart device may display the target image on a user display interface, so that the user can implement functions such as storage, sharing, editing, and even reprocessing. In an embodiment, the smart device may further display the target image and the original image on the user display interface simultaneously, so that the user can learn the difference between the original image and the target image.

According to the embodiments of the present disclosure, for the difference of moiré patterns in different scales and different spatial frequency bands, in the image processing model for removing moiré patterns, a multi-band module constructed based on Laplacian pyramid is designed. By using the feature maps of the Laplacian pyramid in a plurality of frequency bands, an image processing model that can comprehensively remove moiré patterns in different scales and different frequency bands can be trained. In addition, based on the multi-scale model, the prediction module based on the attention mechanism is further provided. In this way, in the blurred image, part of the moiré pattern characteristics and the image brightness characteristics can be directly removed. Moreover, the super-resolution module is further used, which can conveniently achieve a better moiré pattern removal effect.

Figure 10:
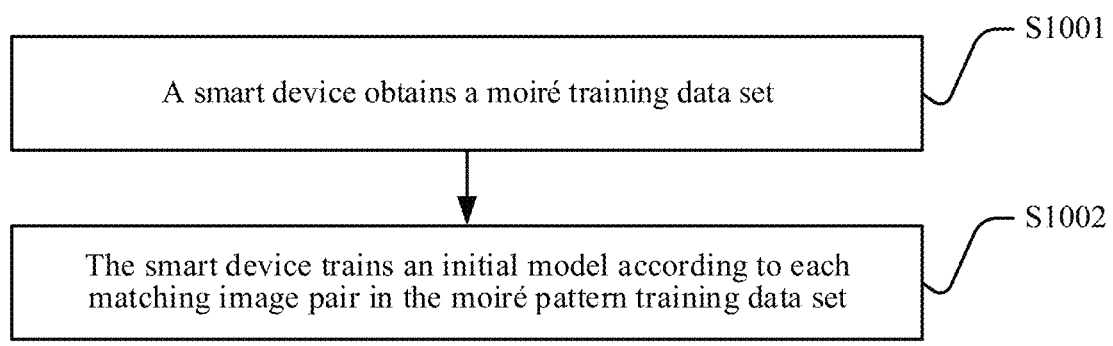
FIG. 10 is a schematic flowchart of training an image processing model according to embodiment(s) of the present disclosure.

FIG. 10 is a schematic flowchart of training an image processing model according to an embodiment of the present disclosure. The training of the image processing model in this embodiment of the present disclosure is performed by smart devices such as servers and personal computers. The image processing model can be obtained through the training process of this embodiment of the present disclosure. The process of training the image processing model includes the following steps:

S1001: A smart device obtains a moiré pattern training data set.

The moiré pattern training data set includes matching image pairs, and the matching image pair includes a training image and a supervision image, where the training image has moiré patterns, and the supervision image does not have the moiré patterns.

S1002: The smart device trains an initial model according to each matching image pair in the moiré pattern training data set to obtain the image processing model.

In this embodiment of the present disclosure, the training of the image processing model is supervised training. According to the known results and the image processing model, the output results after the training image processing are compared. If a condition is met (for example, an L2 loss function value is the smallest), the image processing model is considered to be valid for the training image; otherwise, the model parameters in the image processing model are adjusted until the condition is met. Meanwhile, a large quantity of training images and corresponding supervision images are used to train an image processing model, and an image processing model that can perform moiré pattern removal processing on most images can be obtained.

In this embodiment of the present disclosure, when the moiré pattern training data set is obtained, the matching image pairs are obtained based on processing of the original image data. In the present disclosure, the matching image pairs are determined in a manner of such as analog processing and preprocessing of the original image data. Based on the matching image pairs obtained in this manner, the image processing model can be better trained, and the whole process is automatic, thereby implementing automated and intelligent training, and improving the training efficiency of the image processing model.

In an embodiment, the obtaining the moiré pattern training data set includes: obtaining a supervision image according to original image data, and obtaining a training image with moiré patterns added according to the original image data, where the two steps of obtaining a supervision image according to original image data, and obtaining a training image with moiré patterns added according to the original image data may be performed on a smart device that trains an image processing model training or uses an image processing model, and analog processing may be alternatively performed on the original image data on a dedicated analog device.

In an embodiment, the obtaining a training image with moiré patterns added according to the original image data includes analog processing of the original image data, which further includes the following steps:

S11: The smart device disassembles each pixel in original image data into three sub pixels side by side to obtain a sub-pixel image, each sub pixel being corresponding to a color, and colors of the original image data including red, green, and blue (RGB). The smart device disassembles each pixel in the original image data into three sub pixels side by side, and a color of each sub pixel is an RGB value of the original pixel.

S12: The smart device adjusts a size of the sub-pixel image to obtain a first intermediate image with a size the same as an image size of the original image data, and resizes the sub-pixel new image to the original resolution to obtain the first intermediate image.

S13: The smart device sets grayscale values of pixels whose grayscale values are lower than a first threshold in the first intermediate image as a second threshold, to obtain a second intermediate image. The smart device sets pixels whose grayscale values are close to 0 to a specific threshold greater than 0. For example, pixels whose grayscale values are less than a value such as 5 or 10 are set to 10, which is to simulate the characteristic that a pure black image still has a faint glow on the display. After the second intermediate image is obtained, the gamma is further adjusted to make the outputted image closer to the visual effect of the display. In this embodiment of the present disclosure, the adjusted gamma values may be any suitable values, for example, the suitable values may be any value between 0.8 and 1.5.

S14: The smart device adds radial distortion to the second intermediate image to obtain a first distorted image, to simulate the image distortion caused by the screen curvature of the display.

S15: The smart device performs camera imaging analog adjustment on the first distorted image to obtain a training image with moiré patterns added.

S15 may further include the following steps, so that the obtained training image with moiré patterns added is closer to the real camera photographing effect.

S151: The smart device performs perspective transformation processing on the first distorted image according to a first perspective transformation parameter to obtain a tilt analog image. The perspective transformation is performed on the first distorted image, to simulate the image tilt caused by the sensor not being aligned with the screen when the camera photographs the screen.

S152: The smart device processes the tilt analog image according to an image brightness distribution feature of camera imaging to obtain a brightness analog image. The smart device uses a color filter array (CFA) sampling algorithm of the Bayer array to perform re-sampling interpolation on the tilt analog image outputted in the previous step. In an embodiment, the gamma value of the re-interpolated image may be adjusted again to simulate the image brightness distribution feature during camera imaging.

S153: The smart device adds image noise to the brightness analog image to obtain a noise analog image with image noise. In certain embodiment(s), Gaussian noise may be added to the imaging result map to simulate the image noise generated during imaging of an imaging sensor of a real camera.

S154: The smart device processes the noise analog image according to a preset lighting coefficient to obtain a brightness-darkness analog image. The smart device multiplies different regions of the image by different lighting coefficients, to simulate the uneven brightness and darkness of the image when photographing the screen.

The brightness-darkness analog image finally obtained may be used as the final training image with moiré patterns added.

In an embodiment, the obtaining the supervision image according to the original image data includes:

S21: The smart device adds radial distortion to the original image data to obtain a second distorted image.

This step is the same as the radial distortion processing described in S14 above.

S22: The smart device performs perspective transformation processing on the second distorted image according to the first perspective transformation parameter to obtain a supervision image.

This step is the same as perspective transformation parameters on which the perspective transformation processing described in S151 above is based, and the smart device may directly combine the supervision image and the training image obtained above to form a matching image pair.

Many parameters in the analog image processing above may be flexibly adjusted, to obtain a richer matching image pair. More real-shot moiré pattern images may be added to the moiré pattern training data set to better train the image processing model. For a real-shot moiré pattern image, the difficulty lies in how to perform pixel-level alignment on the photographed moiré pattern image and the original image. The image alignment solution used in this embodiment of the present disclosure is two-stage alignment. First, feature matching is performed on two images (an original image and an image obtained by photographing the original image displayed on the display screen), and perspective transformation is calculated. The optical flow motion field is then calculated from the transformed image for finer alignment, to compensate for image distortion that cannot be represented by projective transformation. In certain embodiment(s), the obtaining a moiré pattern training data set may include:

S31: The smart device displays original image data on an electronic display screen, and photographs the original image data displayed on the electronic display screen to obtain a training image;

S32: The smart device performs feature matching and optical flow alignment processing on the original image data according to the training image, to obtain a supervision image; and S33: The smart device constructs a matching image pair based on the training image and the corresponding supervision image.

In certain embodiment(s), S32 may include:

S321: The smart device performs feature matching processing on the training image and the original image data, and calculates a second perspective transformation parameter according to a feature matching processing result; and performs perspective transformation processing on the original image data according to the second perspective transformation parameter to obtain the projected original image data.

S321 is a feature matching process. Before features of the training image and the original image data are detected and calculated, the images may be de-noised. In an embodiment, a non local means algorithm may be used, and a features from accelerated segment test (FAST) algorithm may be further used to detect features. Feature values of the detected features may be then calculated respectively using various algorithms such as scale-invariant feature transform (SIFT), speeded up robust features (SURF), AKAZE (an image search method that can find matching keypoints between two images), ORB (an algorithm for feature extraction and feature description), and binary robust invariant scalable keypoints (BRISK), and brute force matching is respectively performed. Voting is performed on each pair of feature matching results. If there are more than Y types of algorithms that can support a target feature matching result, the target feature matching result is considered correct. In this way, feature matching results with high confidence can be obtained. The second perspective transformation parameter is then calculated using this group of feature matching results, and the original image data is projected onto the training image, to obtain a registration result.

S322: The smart device calculates a pixel coordinate correspondence table between the training image and the projected original image data based on the optical flow method.

This step corresponds to the optical flow alignment processing, and may be an image warping process based on the optical flow method. The registration result based on the second perspective transformation parameter in this step is not completely pixel-level alignment, and there is an average difference of 10 pixels in experimental statistics, which is caused by screen curvature and lens distortion. In this embodiment of the present disclosure, the optical flow method is further used to reduce the final error. In certain embodiment(s), a dense optical flow motion field may be calculated to obtain a correspondence table of pixel coordinates between the training image and the original image data after projection processing, and then the projection is performed. Through experimental analysis, a variational optical flow algorithm is finally selected. The optical flow obtained by using this algorithm can achieve a better balance between smoothness and accuracy. In terms of use details, an image gradient is used as a data item of the variational optical flow method, which can effectively avoid the brightness difference between the photographed image and the original image. In addition, Gaussian blurring is performed on both the training image and the projected original image data, to reduce the impact of moiré pattern noise, and make the image smoother and more derivable.

S323: The smart device performs projection adjustment on the projected original image data according to the pixel coordinate correspondence table, to obtain a supervision image corresponding to the training image.

After S321, S322, and S323, the training image and the supervision image may be aligned at the pixel level. In this way, it can be guaranteed that the training image and the supervision image aligned at the pixel level are used to train the initial model to obtain the image processing model. The image processing model performs moiré pattern removal processing on an image with moiré patterns to obtain a target image with normal scale and normal content, and there is no content inconsistency between the target image and the original image with moiré patterns.

After a large quantity of matching image pairs are obtained, the initial model may be trained. For the structure of the initial model, refer to the structure shown in FIG. 9. The training of the initial model may take into account any one or a combination of the following plurality of model training methods.

The first model training method:

In an embodiment, an initial model or an image processing model may simultaneously include: a multi-band module, a prediction module based on the attention mechanism, and a super-resolution module. A result outputted by the super-resolution module is a model output result. In the training process, based on training results outputted by the multi-band module, the prediction module, and the super-resolution module, respective loss function values may be determined through the L2 loss function, and model parameters can be adjusted according to the loss function values. In certain embodiment(s), FIG. 11 is a schematic diagram of supervised training of an initial model based on three output results of a model.

Figure 11:
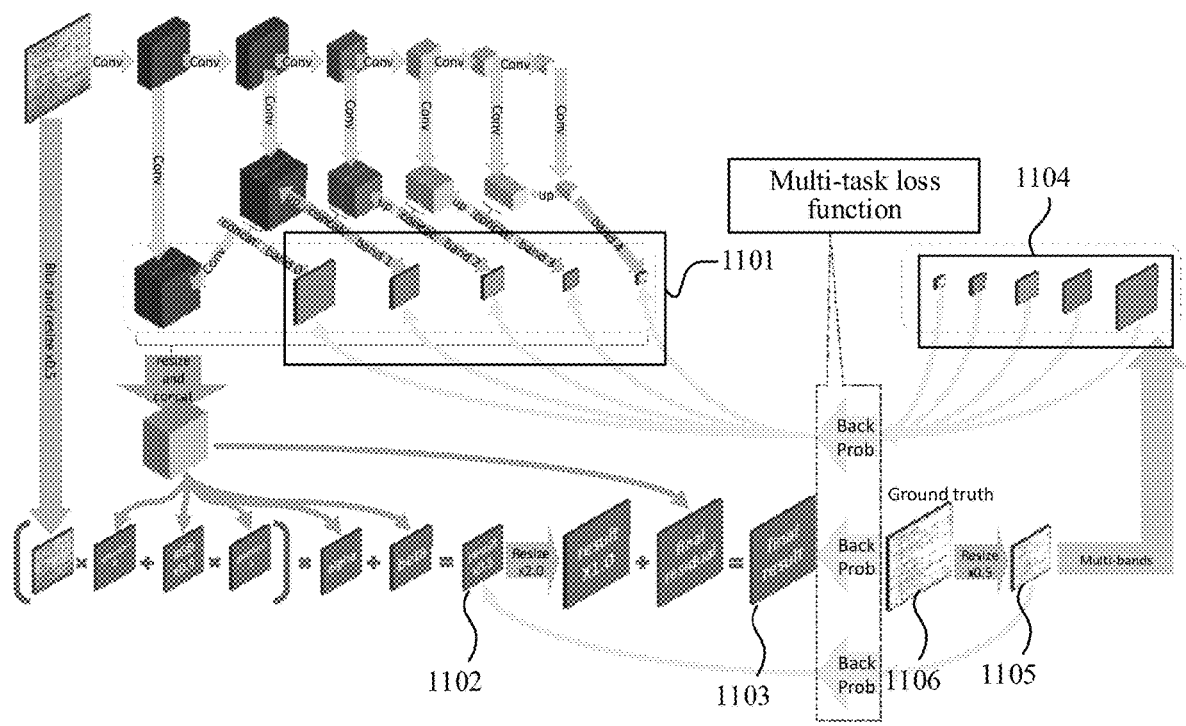
FIG. 11 is a schematic structural diagram of training an image processing model according to embodiment(s) of the present disclosure.

When the initial model includes the multi-band module, the prediction module, and the super-resolution module, the training an initial model according to each matching image pair in the moiré pattern training data set includes the following steps: processing the training image in the matching image pair of the moiré pattern training data set as an input of the initial model by using the initial model, to obtain a first result 1101 outputted by the multi-band module, a second result 1102 outputted by the prediction module, and a third result 1103 outputted by the super-resolution module, the first result 1101 including feature maps of N spatial frequency bands corresponding to an N-layer Laplacian pyramid of the training image, where as shown in FIG. 11, feature maps of five spatial frequency bands may be obtained from a five-layer Laplacian pyramid, the first result includes the five feature maps corresponding to the five spatial frequency bands, the second result includes a second result feature map corresponding to the training image, and the third result includes a target image corresponding to the training image; performing N-layer Laplacian pyramid processing on the supervision image in the matching image pair of the moiré pattern training data set to obtain feature maps of N spatial frequency bands corresponding to the supervision image; obtaining N basic loss function values of the feature maps of the N spatial frequency bands corresponding to the supervision image and the feature maps of the N spatial frequency bands in the first result 1101; and performing N-layer Laplacian pyramid processing on the supervision image to obtain feature maps of N spatial frequency bands of the supervision image, as five feature maps in a feature map set 1104 shown in FIG. 11, where loss values may be calculated between the feature maps in the feature map set 1104 and the feature maps of the same scale in the first result 1101 based on the L2 loss function, and five basic loss function values may be obtained in FIG. 11; obtaining a first loss function value between an image obtained after resolution processing is performed on the supervision image and the second result 1102, where an image 1105 is obtained after resolution processing is performed on the supervision image, and loss values may be calculated between the second result 1102 and the image 1105 based on the L2 loss function; obtaining a second loss function value between the supervision image 1106 and the third result 1103, where loss values may be calculated between the supervision image 1106 and the feature maps of the third result 1103 based on the L2 loss function; and adjusting model parameters of the initial model according to the N basic loss function values, the first loss function value, and the second loss function value, to obtain the image processing model.

Based on the description, under the model in FIG. 11, there are five, one, and one L2 loss functions respectively. The final loss function may be directly added by the seven L2 loss function values. Due to the difference in magnitude caused by the difference in the quantity of pixels of each L2 loss, the direct addition is a proper weight.

In an embodiment, an initial model or an image processing model may include: a multi-band module. A result outputted by the multi-band module is a model output result. In the training process, based on training results outputted by the multi-band module, loss function values may be determined through the L2 loss function, and model parameters can be adjusted according to the loss function values.

In an embodiment, an initial model or an image processing model may include: a multi-band module and a prediction module based on the attention mechanism. A result outputted by the prediction module is a model output result. In the training process, based on training results outputted by the multi-band module and the prediction module based on the attention mechanism, respective loss function values may be determined through the L2 loss function, and model parameters can be adjusted according to the loss function values.

The second model training method:

In an embodiment, to improve the moiré pattern removal capability of the image processing model, it is further considered that a moiré pattern image has different moiré patterns in various scales. Therefore, during training of the initial model of the image processing model, multi-scale learning is performed. In certain embodiment(s), the training an initial model according to each matching image pair in the moiré pattern training data set includes: performing size adjustment on images in a target matching image pair of the moiré pattern training data set to obtain P deformed matching image pairs of different sizes; and training the initial model according to the P deformed matching image pairs to obtain P loss function values, and adjusting model parameters of the initial model according to the P loss function values, to obtain the image processing model.

Training samples of each matching image pair are scaled to 256×256, 384×384, 512×512, 768×768 and other resolutions, to obtain a plurality of deformed matching image pairs of different scales. Each deformed matching image pair is used as a piece of training data separately, inputted into the initial model respectively, and trained according to the first model training method. A loss function value is then calculated respectively. Finally, loss function values are added for training, that is, a total loss function value is an addition of all loss functions. The adjusted model can make a value obtained by adding the corresponding loss function values to be a minimum value. In this way, each time a sample is trained, the initial model can learn moiré patterns at different resolutions simultaneously, and the moiré pattern removal capability learned by the initial model can be more robust. Through practice, a common phenomenon is found that a larger resolution indicates a better moiré pattern removal effect.

The third model training method:

To use more images with moiré patterns for model training, the present disclosure can further directly train the model based on a large quantity of images with moiré patterns. In an embodiment, the training of the image processing model in the image processing method may further include the following steps.

Size enlargement is performed on the training image in the moiré pattern training data set to obtain an enlarged moiré pattern image of a target size. There are no matching image pairs in the moiré pattern training data set, and only moiré pattern images with moiré patterns are included in the moiré pattern training data set, without supervision images corresponding to the moiré pattern images. Compared with obtaining matching image pairs by using processing methods such as analog processing described in the embodiments, obtaining matching image pairs by obtaining images with moiré patterns through photographing and performing processing such as feature matching and optical flow processing makes it easier to directly obtain images with moiré patterns. For example, after the position of the camera is adjusted, an image displayed on the computer display is photographed at a specific time interval. In addition, the computer display switches different image content to the camera for photographing at a specific time interval, so that a large quantity of moiré pattern images with moiré patterns can be easily obtained.

During the training, the first image processing model is run to perform moiré pattern removal processing on the enlarged moiré pattern image to obtain a moiré pattern supervision image. The model obtained through training according to each matching image pair in the moiré pattern training data set described above is used as a first image processing model. For example, after the initial model is trained by using the first model training method and/or the second model training method, the obtained image processing model is used as the first image processing model. The first image processing model may be alternatively a model for moiré pattern removal trained by using other training methods. Based on the first image processing model, self-supervised training is further performed based on a large quantity of images with moiré patterns to obtain an image processing model with better performance.

The moiré pattern supervision image and the enlarged moiré pattern image are scaled to obtain a plurality of moiré pattern image pairs. Model parameters of the first image processing model are adjusted according to the plurality of moiré pattern image pairs to obtain the image processing model.

It is found in the multi-scale learning process corresponding to the second model training method that if an image with moiré patterns is scaled to a relatively large resolution, the moiré patterns are easily removed by the model. Based on this finding, self-supervised learning of the first image processing model is performed. When this batch of unlabeled data (that is, the large quantity of moiré pattern images in the moiré pattern training data set) is trained through the first image processing model, original images of the moiré pattern images are enlarged to 1664×1664 (or other larger sizes). The first image processing model is run to perform moiré pattern removal processing. Results outputted by the first image processing model are used as ground truth of moiré pattern supervision images of the corresponding moiré pattern images. For the moiré pattern matching image pairs formed by the moiré pattern images and the moiré pattern supervision images, the moiré pattern matching image pairs are scaled to scales such as 256×256, 384×384, 512×512, and 768×768, and the first image processing model is re-trained in a plurality of scales. After training to convergence, the image processing model with better performance can be obtained.

In an embodiment, a newly trained model can be further used as a new first image processing model, moiré patterns of a moiré pattern image of 1664×1664 (or other larger sizes) may be removed by using the new first image processing model. pattern, and self-supervised training is performed again. In this way, one or more image processing models that can remove moiré patterns on images can be finally obtained.

In an embodiment, the model obtained by adjusting the model parameters of the first image processing model according to the plurality of moiré pattern image pairs obtained through the enlargement processing and the moiré pattern removal processing of the first image processing model is used as a first version of image processing model.

The first version of image processing model is used as a new first image processing model, to train the new first image processing model according to the moiré pattern training data set to obtain a second version of image processing model. Further, the second version of image processing model may be used as a new first image processing model, and so on, to obtain a plurality of versions of image processing models.

After two or more versions of image processing models are obtained, the process of running an image processing model to perform moiré pattern removal processing on the original image to obtain a target image may include the following steps: running the first version of image processing model and the second version of image processing model to perform moiré pattern removal processing on the original image to obtain a first image and a second image. When there are a plurality of versions of image processing models, another version of image processing model may be alternatively run to perform moiré pattern removal processing on the original image to obtain another image.

The target image is obtained according to the first image and the second image. When the target image is determined according to the first image and the second image, and even an image obtained by performing moiré pattern removal processing by more versions of image processing models, images outputted by all versions of image processing models can be compared according to local image regions even pixel by pixel, and the target image is constructed according to a local image region or pixels with the best moiré pattern removal effect. In other words, after training for a plurality of times, many versions of image processing models can be obtained. These image processing models have different capabilities. Therefore, these image processing models may be used to reduce the moiré patterns on the original image respectively, and then the results are merged, to obtain a better moiré pattern removal effect.

In an embodiment, the merging method is to determine a local image region and/or pixels with the smallest gradient in an image outputted by each version of image processing model, and the local image region and/or pixels with the smallest gradient is selected to finally construct a target image based on each selected local image region and/or pixels. For example, an image is divided into upper and lower local image regions. A gradient of an upper local image region of a first image is less than that of an upper local image region of a second image, and a gradient of a lower local image region of the second image is less than a lower local image region of first image. Therefore, the upper local image region of the first image and the lower local image region of the second image may be merged to obtain a final target image.

In some other embodiments, alternatively, an image with the best removal effect may be simply selected as the final target image from the first image, the second image, or even images outputted by more versions of image processing models. Images outputted by two or more versions of image processing models may be displayed on the interface simultaneously. In addition, a user selection operation is received, and an image selected by the user selection operation is used as the final target image.

After the image processing model is obtained by using the method, in order to make the output result of the image processing model more realistic, the model parameters of the image processing model can be further fine-tuned by using a generative adversarial network. The role of a discriminator of the generative adversarial network is to distinguish a network output image from a real image without moiré patterns, and a loss function thereof is a classification cross entropy. A loss functions of a generator of the generative adversarial network is added by two parts, one is a negative discriminator loss function, and the other is an L2 loss function of a difference between a generated graph and an old model generated graph. The design purpose of the loss functions of the generative adversarial network is to not only generate a more realistic image without moiré patterns by using the image processing model, but also ensure that the capability of removing moiré patterns is not too different from that of the original image processing model.

Figure 12:
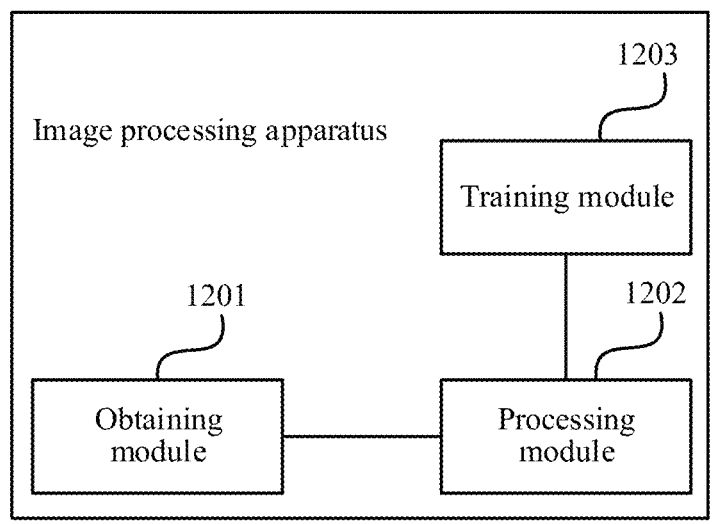
FIG. 12 is a schematic structural diagram of an image processing apparatus according to embodiment(s) of the present disclosure.

FIG. 12 is a schematic structural diagram of an image processing apparatus according to an embodiment of the present disclosure. The apparatus according to this embodiment of the present disclosure may be disposed in a smart device, and the smart device may be a smartphone, a tablet computer, a personal computer, or other devices. The apparatus includes the following modules: an obtaining module 1201, configured to obtain an original image; and a processing module 1202, configured to run an image processing model to perform moiré pattern removal processing on the original image to obtain a target image, the image processing model being a network model pre-trained according to a moiré pattern training data set, and the image processing model including a multi-band module, the multi-band module being configured to process the original image to obtain an N-layer Laplacian pyramid of the original image, and obtain a first processing result feature map based on feature maps corresponding to N spatial frequency bands of the N-layer Laplacian pyramid, the target image being obtained according to the first processing result feature map, and N being a positive integer greater than or equal to 2.

In an embodiment, the processing module 1202 is further configured to: run the image processing model to perform M times of initial analysis processing on the original image by using the multi-band module, to obtain initial feature maps in N scales, M being a positive integer greater than or equal to 2, M being greater than or equal to N, and the initial analysis processing including: first down-sampling and then performing convolution processing on the original image, or performing down-scaled convolution processing on the original image; perform convolution processing on the initial feature maps in N scales to obtain intermediate feature maps in N scales; obtain the feature maps corresponding to the N spatial frequency bands of the N-layer Laplacian pyramid according to the intermediate feature maps in N scales; obtain the first processing result feature map according to the feature maps corresponding to the N spatial frequency bands; and obtain the target image according to the first processing result feature map.

In an embodiment, in the feature maps corresponding to the N spatial frequency bands, a feature map of an Nth spatial frequency band is obtained according to an Nth intermediate feature map with a smallest scale in the intermediate feature maps; and in the feature maps corresponding to the N spatial frequency bands, a feature map of an (N-i)th spatial frequency band is obtained according to the Nth intermediate feature map, an (N-i)th intermediate feature map, and all intermediate feature maps between the Nth intermediate feature map and the (N-i)th intermediate feature map, i being a positive integer greater than or equal to 1 and less than N.

In an embodiment, the processing module 1202 is further configured to: obtain a predicted feature map, the predicted feature map being obtained according to an Nth intermediate feature map, a 1st intermediate feature map, and all intermediate feature maps between the Nth intermediate feature map and the 1st intermediate feature map; perform size adjustment on feature maps whose scales are smaller than a scale of the predicted feature map in the feature maps corresponding to the N spatial frequency bands, so that scales of the adjusted feature maps corresponding to the spatial frequency bands are equal to the scale of the predicted feature map; and obtain the first processing result feature map according to the predicted feature map and the adjusted feature maps corresponding to the spatial frequency bands.

In an embodiment, the image processing model further includes a prediction module based on an attention mechanism, and the processing module 1202 is further configured to: obtain a blurred feature map obtained by blurring the original image; obtain a second processing result feature map according to the first processing result feature map and the blurred feature map by using the prediction module; and obtain the target image according to the second processing result feature map.

In an embodiment, the image processing model further includes a super-resolution module, and the processing module 1202 is further configured to: obtain a reference feature map according to the first processing result feature map, and obtain an intermediate result feature map by processing the second processing result feature map, a scale of the reference feature map being the same as a scale of the original image, and a scale of the intermediate result feature map being the same as the scale of the original image; and obtain the target image according to the reference feature map and the intermediate result feature map by using the super-resolution module.

In an embodiment, the apparatus further includes a training module 1203.

The training module 1203 is configured to: obtain the moiré pattern training data set, the moiré pattern training data set including matching image pairs, the matching image pair including a training image and a supervision image, where the training image has moiré patterns, and the supervision image does not have the moiré patterns; and train an initial model according to each matching image pair in the moiré pattern training data set to obtain the image processing model.

In an embodiment, the training module 1203 is further configured to: disassemble each pixel in original image data into three sub pixels side by side to obtain a sub-pixel image, each sub pixel being corresponding to a color, and colors of the original image data including RGB; adjust a size of the sub-pixel image to obtain a first intermediate image with a size the same as an image size of the original image data; set grayscale values of pixels whose grayscale values are lower than a first threshold in the first intermediate image as a second threshold, to obtain a second intermediate image; add radial distortion to the second intermediate image to obtain a first distorted image; and perform camera imaging analog adjustment on the first distorted image to obtain a training image with moiré patterns added.

In an embodiment, the training module 1203 is further configured to: perform perspective transformation processing on the first distorted image according to a first perspective transformation parameter to obtain a tilt analog image; process the tilt analog image according to an image brightness distribution feature of camera imaging to obtain a brightness analog image; add image noise to the brightness analog image to obtain a noise analog image with image noise; and process the noise analog image according to a preset lighting coefficient to obtain a brightness-darkness analog image.

In an embodiment, the training module 1203 is further configured to: add radial distortion to the original image data to obtain a second distorted image; and perform perspective transformation processing on the second distorted image according to the first perspective transformation parameter to obtain a supervision image.

In an embodiment, the training module 1203 is further configured to: display original image data on an electronic display screen, and photograph the original image data displayed on the electronic display screen to obtain a training image; perform feature matching and optical flow alignment processing on the original image data according to the training image, to obtain a supervision image; and construct a matching image pair based on the training image and the corresponding supervision image.

In an embodiment, the initial model includes: a multi-band module to be trained, an attention mechanism-based prediction module to be trained, and a super-resolution module to be trained.

In an embodiment, the training module 1203 is further configured to: process the training image in the matching image pair of the moiré pattern training data set as an input of the initial model by using the initial model, to obtain a first result outputted by the multi-band module, a second result outputted by the prediction module, and a third result outputted by the super-resolution module, the first result including feature maps of N spatial frequency bands corresponding to an N-layer Laplacian pyramid of the training image, the second result including a second result feature map corresponding to the training image, and the third result including a target image corresponding to the training image; perform N-layer Laplacian pyramid processing on the supervision image in the matching image pair of the moiré pattern training data set to obtain feature maps of N spatial frequency bands corresponding to the supervision image; obtain N basic loss function values of the feature maps of the N spatial frequency bands corresponding to the supervision image and the feature maps of the N spatial frequency bands in the first result, obtain a first loss function value between an image obtained after resolution processing is performed on the supervision image and the second result, and obtain a second loss function value between the supervision image and the third result; and adjust model parameters of the initial model according to the N basic loss function values, the first loss function value, and the second loss function value, to obtain the image processing model.

In an embodiment, the training module 1203 is further configured to: perform size adjustment on images in a target matching image pair of the moiré pattern training data set to obtain P deformed matching image pairs of different sizes; and train the initial model according to the P deformed matching image pairs to obtain P loss function values, and adjust model parameters of the initial model according to the P loss function values, to obtain the image processing model.

In an embodiment, the model obtained through training according to each matching image pair in the moiré pattern training data set is used as a first image processing model, and the training module 1203 is further configured to: perform size enlargement on the training image in the moiré pattern training data set to obtain an enlarged moiré pattern image of a target size; run the first image processing model to perform moiré pattern removal processing on the enlarged moiré pattern image to obtain a moiré pattern supervision image; scale the moiré pattern supervision image and the enlarged moiré pattern image to obtain a plurality of moiré pattern image pairs; and adjust model parameters of the first image processing model according to the plurality of moiré pattern image pairs to obtain the image processing model.

In an embodiment, the model obtained by adjusting the model parameters of the first image processing model according to the plurality of moiré pattern image pairs is used as a first version of image processing model; the first version of image processing model is used as a new first image processing model, to train the new first image processing model according to the moiré pattern training data set to obtain a second version of image processing model; the image processing model includes: the first version of image processing model and the second version of image processing model; and the processing module 1202 is further configured to: run the first version of image processing model and the second version of image processing model to perform moiré pattern removal processing on the original image to obtain a first image and a second image; and obtain the target image according to the first image and the second image.

For specific implementations of the modules included in the apparatus according to this embodiment of the present disclosure, refer to the detailed description of the related steps in the embodiments. Details are not described herein.

According to the embodiments of the present disclosure, for the difference of moiré patterns in different scales and different spatial frequency bands, in the image processing model for removing moiré patterns, a multi-scale model constructed based on Laplacian pyramid is designed. By using the feature maps of the Laplacian pyramid in a plurality of frequency bands, an image processing model that can comprehensively remove moiré patterns in different scales and different frequency bands can be trained, and a better moiré pattern removal effect can be conveniently achieved.

Figure 13:
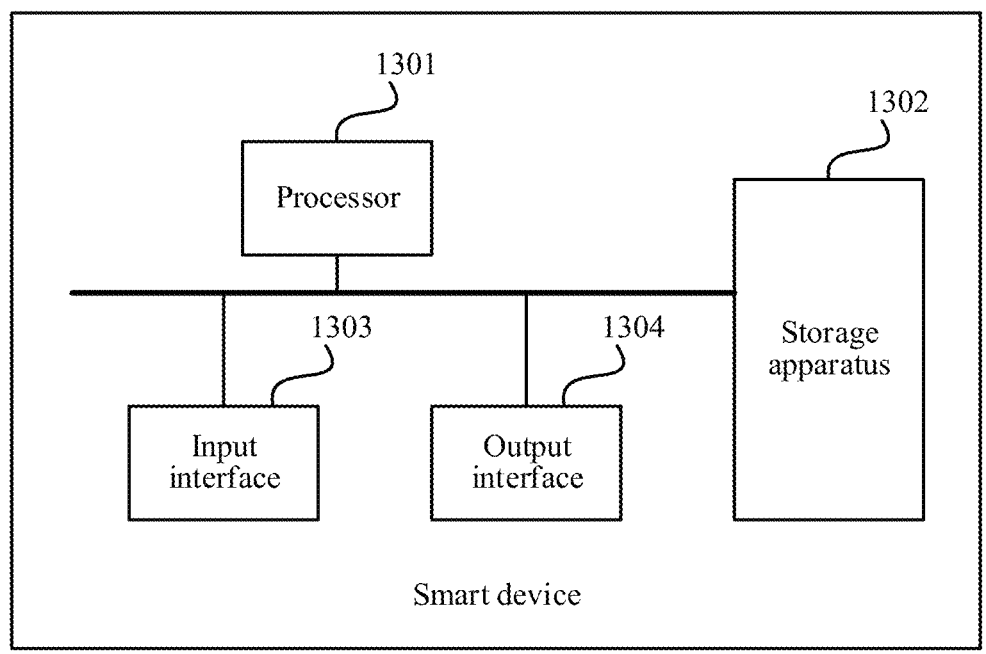
FIG. 13 is a schematic structural diagram of a smart device according to embodiment(s) of the present disclosure.

FIG. 13 is a schematic structural diagram of a smart device according to an embodiment of the present disclosure. The smart device according to this embodiment of the present disclosure may be, for example, a smartphone, a tablet computer, a personal computer, or a server. The smart device can implement functions such as data transmission, storage, data analysis, and editing. The smart device further includes various housing structures, and includes a power supply, a communication interface, and the like. The smart device may further include a processor 1301, a storage apparatus 1302, an input interface 1303, and an output interface 1304.

The input interface 1303 may be some user interfaces, or data interfaces, or communication interfaces, and can obtain some data. The output interface 1304 may be some network interfaces capable of sending data to the outside, and the output interface 1304 may output processed data to a display, so that the display may display data such as an image with moiré patterns removed outputted by the output interface 1304.

The storage apparatus 1302 may include a volatile memory such as a random-access memory (RAM); the storage apparatus 1302 may alternatively include a non-volatile memory such as a flash memory or a solid-state drive (SSD); and the storage apparatus 1302 may alternatively include a combination of the types of memories.

The processor 1301 may be a central processing unit (CPU). The processor 1301 may further include a hardware chip. The hardware chip may be an application-specific integrated circuit (ASIC), a programmable logic device (PLD), or the like. The PLD may be a field-programmable gate array (FPGA), a generic array logic (GAL), or the like.

In this embodiment of the present disclosure, the storage apparatus 1302 stores program instructions, and the processor 1301 invokes the program instructions stored in the storage apparatus 1302 to perform the relevant methods and steps described in the embodiments.

In an embodiment, the processor 1301 is configured to perform the following steps: obtaining an original image; and running an image processing model to perform moiré pattern removal processing on the original image to obtain a target image, the image processing model being a network model pre-trained according to a moiré pattern training data set, and the image processing model including a multi-band module, the multi-band module being configured to process the original image to obtain an N-layer Laplacian pyramid of the original image, and obtain a first processing result feature map based on feature maps corresponding to N spatial frequency bands of the N-layer Laplacian pyramid, the target image being obtained according to the first processing result feature map, and N being a positive integer greater than or equal to 2.

In an embodiment, the processor 1301 is further configured to perform the following steps: running the image processing model to perform M times of initial analysis processing on the original image by using the multi-band module, to obtain initial feature maps in N scales, M being a positive integer greater than or equal to 2, M being greater than or equal to N, and the initial analysis processing including: first down-sampling and then performing convolution processing on the original image, or performing down-scaled convolution processing on the original image; performing convolution processing on the initial feature maps in N scales to obtain intermediate feature maps in N scales; obtaining the feature maps corresponding to the N spatial frequency bands of the N-layer Laplacian pyramid according to the intermediate feature maps in N scales; obtaining the first processing result feature map according to the feature maps corresponding to the N spatial frequency bands; and obtaining the target image according to the first processing result feature map.

In an embodiment, in the feature maps corresponding to the N spatial frequency bands, a feature map of an Nth spatial frequency band is obtained according to an Nth intermediate feature map with a smallest scale in the intermediate feature maps; and in the feature maps corresponding to the N spatial frequency bands, a feature map of an (N-i)th spatial frequency band is obtained according to the Nth intermediate feature map, an (N-i)th intermediate feature map, and all intermediate feature maps between the Nth intermediate feature map and the (N-i)th intermediate feature map, i being a positive integer greater than or equal to 1 and less than N.

In an embodiment, the processor 1301 is further configured to perform the following steps: obtaining a predicted feature map, the predicted feature map being obtained according to an Nth intermediate feature map, a 1st intermediate feature map, and all intermediate feature maps between the Nth intermediate feature map and the 1st intermediate feature map; performing size adjustment on feature maps whose scales are smaller than a scale of the predicted feature map in the feature maps corresponding to the N spatial frequency bands, so that scales of the adjusted feature maps corresponding to the spatial frequency bands are equal to the scale of the predicted feature map; and obtaining the first processing result feature map according to the predicted feature map and the adjusted feature maps corresponding to the spatial frequency bands.

In an embodiment, the image processing model further includes a prediction module based on an attention mechanism, and the processor 1301 is configured to perform the following steps: obtaining a blurred feature map obtained by blurring the original image; obtaining a second processing result feature map according to the first processing result feature map and the blurred feature map by using the prediction module; and obtaining the target image according to the second processing result feature map.

In an embodiment, the image processing model further includes a super-resolution module, and the processor 1301 is configured to perform the following steps: obtaining a reference feature map according to the first processing result feature map, and obtaining an intermediate result feature map by processing the second processing result feature map, a scale of the reference feature map being the same as a scale of the original image, and a scale of the intermediate result feature map being the same as the scale of the original image; and obtaining the target image according to the reference feature map and the intermediate result feature map by using the super-resolution module.

In an embodiment, the processor 1301 is further configured to perform the following steps: obtaining the moiré pattern training data set, the moiré pattern training data set including matching image pairs, the matching image pair including a training image and a supervision image, where the training image has moiré patterns, and the supervision image does not have the moiré patterns; and training an initial model according to each matching image pair in the moiré pattern training data set to obtain the image processing model.

In an embodiment, the processor 1301 is further configured to perform the following steps: disassembling each pixel in original image data into three sub pixels side by side to obtain a sub-pixel image, each sub pixel being corresponding to a color, and colors of the original image data including RGB; adjusting a size of the sub-pixel image to obtain a first intermediate image with a size the same as an image size of the original image data; setting grayscale values of pixels whose grayscale values are lower than a first threshold in the first intermediate image as a second threshold, to obtain a second intermediate image; adding radial distortion to the second intermediate image to obtain a first distorted image; and performing camera imaging analog adjustment on the first distorted image to obtain a training image with moiré patterns added.

In an embodiment, the processor 1301 is further configured to perform the following steps: performing perspective transformation processing on the first distorted image according to a first perspective transformation parameter to obtain a tilt analog image; processing the tilt analog image according to an image brightness distribution feature of camera imaging to obtain a brightness analog image; adding image noise to the brightness analog image to obtain a noise analog image with image noise; and processing the noise analog image according to a preset lighting coefficient to obtain a brightness-darkness analog image.

In an embodiment, the processor 1301 is further configured to perform the following steps: adding radial distortion to the original image data to obtain a second distorted image; and performing perspective transformation processing on the second distorted image according to the first perspective transformation parameter to obtain a supervision image.

In an embodiment, the processor 1301 is further configured to perform the following steps: displaying original image data on an electronic display screen, and photographing the original image data displayed on the electronic display screen to obtain a training image; performing feature matching and optical flow alignment processing on the original image data according to the training image, to obtain a supervision image; and constructing a matching image pair based on the training image and the corresponding supervision image.

In an embodiment, the initial model includes: a multi-band module to be trained, an attention mechanism-based prediction module to be trained, and a super-resolution module to be trained; and the processor 1301 is configured to perform the following steps: processing the training image in the matching image pair of the moiré pattern training data set as an input of the initial model by using the initial model, to obtain a first result outputted by the multi-band module, a second result outputted by the prediction module, and a third result outputted by the super-resolution module, the first result including feature maps of N spatial frequency bands corresponding to an N-layer Laplacian pyramid of the training image, the second result including a second result feature map corresponding to the training image, and the third result including a target image corresponding to the training image; performing N-layer Laplacian pyramid processing on the supervision image in the matching image pair of the moiré pattern training data set to obtain feature maps of N spatial frequency bands corresponding to the supervision image; obtaining N basic loss function values of the feature maps of the N spatial frequency bands corresponding to the supervision image and the feature maps of the N spatial frequency bands in the first result, obtaining a first loss function value between an image obtained after resolution processing is performed on the supervision image and the second result, and obtaining a second loss function value between the supervision image and the third result; and adjusting model parameters of the initial model according to the N basic loss function values, the first loss function value, and the second loss function value, to obtain the image processing model.

In an embodiment, the processor 1301 is further configured to perform the following steps: performing size adjustment on images in a target matching image pair of the moiré pattern training data set to obtain P deformed matching image pairs of different sizes; and training the initial model according to the P deformed matching image pairs to obtain P loss function values, and adjusting model parameters of the initial model according to the P loss function values, to obtain the image processing model.

In an embodiment, the model obtained through training according to each matching image pair in the moiré pattern training data set is used as a first image processing model, and the processor 1301 is further configured to perform the following steps: performing size enlargement on the training image in the moiré pattern training data set to obtain an enlarged moiré pattern image of a target size; running the first image processing model to perform moiré pattern removal processing on the enlarged moiré pattern image to obtain a moiré pattern supervision image; scaling the moiré pattern supervision image and the enlarged moiré pattern image to obtain a plurality of moiré pattern image pairs; and adjusting model parameters of the first image processing model according to the plurality of moiré pattern image pairs to obtain the image processing model.

In an embodiment, the processor 1301 is further configured to perform the following steps: the model obtained by adjusting the model parameters of the first image processing model according to the plurality of moiré pattern image pairs is used as a first version of image processing model; the first version of image processing model is used as a new first image processing model, to train the new first image processing model according to the moiré pattern training data set to obtain a second version of image processing model; the image processing model includes: the first version of image processing model and the second version of image processing model; and the processor 1301 is configured to perform the following steps: running the first version of image processing model and the second version of image processing model to perform moiré pattern removal processing on the original image to obtain a first image and a second image; and obtaining the target image according to the first image and the second image.

For specific implementations of the processor 1301 according to this embodiment of the present disclosure, refer to the detailed description of the related steps in the embodiments. Details are not described herein.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to the embodiments of the present disclosure, for the difference of moiré patterns in different scales and different spatial frequency bands, in the image processing model for removing moiré patterns, a multi-scale model constructed based on Laplacian pyramid is designed. By using the feature maps of the Laplacian pyramid in a plurality of frequency bands, an image processing model that can comprehensively remove moiré patterns in different scales and different frequency bands can be trained, and a better moiré pattern removal effect can be conveniently achieved.

A person skilled in the art may understand that all or some of the procedures of the methods of the embodiments may be implemented by a computer program instructing relevant hardware. The program may be stored in a computer-readable storage medium. When the program is executed, the procedures of the method embodiments may be implemented. The storage medium may be a magnetic disk, an optical disc, a read-only memory (ROM), a random access memory (RAM), or the like.

In some other embodiments, the present disclosure further provides a computer program product, including instructions, the instructions, when run on a computer, causing the computer to perform the image processing method according to any one of the embodiments.

The descriptions are merely some embodiments of the present disclosure, and are not intended to limit the scope of the present disclosure. A person of ordinary skill in the art may understand and implement all or some procedures of the embodiments, and equivalent modifications made according to the claims of the present disclosure shall still fall within the scope of the present disclosure.

What is claimed is:

1. An image processing method, performed by an electronic device, the method comprising:
obtaining a moiré pattern training data set, the moiré pattern training data set including matching image pairs, the matching image pair including a training image and a supervision image, wherein the training image has moiré patterns, and the supervision image does not have the moiré patterns, wherein obtaining the moiré pattern training data set comprises:
disassembling each pixel in original image data into three sub pixels side by side to obtain a sub-pixel image, each sub pixel being corresponding to a color, and colors of the original image data comprising red, green, and blue (RGB);
adjusting a size of the sub-pixel image to obtain a first intermediate image with a size the same as an image size of the original image data;
setting grayscale values of pixels whose grayscale values are lower than a first threshold in the first intermediate image as a second threshold, to obtain a second intermediate image;
adding radial distortion to the second intermediate image to obtain a first distorted image; and
performing camera imaging analog adjustment on the first distorted image to obtain a training image with moiré patterns added;

training an initial model according to each matching image pair in the moiré pattern training data set to obtain an image processing model;

obtaining an original image; and running the image processing model to perform moiré pattern removal processing on the original image to obtain a target image, wherein the image processing model includes a multi-band module, the multi-band module being configured to process the original image to obtain an N-layer Laplacian pyramid of the original image, and obtain a first processing result feature map based on feature maps corresponding to N spatial frequency bands of the N-layer Laplacian pyramid, the target image being obtained according to the first processing result feature map, and N being a positive integer greater than or equal to 2.

2. The method according to claim 1, wherein running the image processing model comprises:

running the image processing model to perform M times of initial analysis processing on the original image by using the multi-band module, to obtain initial feature maps in N scales, M being a positive integer greater than or equal to 2, M being greater than or equal to N, and the initial analysis processing comprising:

down-sampling and performing convolution processing on the original image, or performing down-scaled convolution processing on the original image;

performing convolution processing on the initial feature maps in N scales to obtain intermediate feature maps in N scales;

obtaining the feature maps corresponding to the N spatial frequency bands of the N-layer Laplacian pyramid according to the intermediate feature maps in N scales;

obtaining the first processing result feature map according to the feature maps corresponding to the N spatial frequency bands; and obtaining the target image according to the first processing result feature map.

3. The method according to claim 2, wherein in the feature maps corresponding to the N spatial frequency bands, a feature map of an $N^{th}$ spatial frequency band is obtained according to an $N^{th}$ intermediate feature map with a smallest scale in the intermediate feature maps; and in the feature maps corresponding to the N spatial frequency bands, a feature map of an $(N-i)^{th}$ spatial frequency band is obtained according to the $N^{th}$ intermediate feature map, an $(N-i)^{th}$ intermediate feature map, and all intermediate feature maps between the $N^{th}$ intermediate feature map and the $(N-i)^{th}$ intermediate feature map, i being a positive integer greater than or equal to 1 and less than N.

4. The method according to claim 2, wherein obtaining the first processing result feature map comprises:

obtaining a predicted feature map, the predicted feature map being obtained according to an $N^{th}$ intermediate feature map, a $1^{st}$ intermediate feature map, and all intermediate feature maps between the $N^{th}$ intermediate feature map and the $1^{st}$ intermediate feature map;

performing size adjustment on feature maps whose scales are smaller than a scale of the predicted feature map in the feature maps corresponding to the N spatial frequency bands, so that scales of the adjusted feature maps corresponding to the spatial frequency bands are equal to the scale of the predicted feature map; and obtaining the first processing result feature map according to the predicted feature map and the adjusted feature maps corresponding to the spatial frequency bands.

5. The method according to claim 2, wherein the image processing model further includes a prediction module, and obtaining the target image comprises:

obtaining a blurred feature map obtained by blurring the original image;

obtaining a second processing result feature map according to the first processing result feature map and the blurred feature map by using the prediction module; and obtaining the target image according to the second processing result feature map.

6. The method according to claim 5, wherein the image processing model further includes a super-resolution module, and obtaining the target image comprises:

obtaining a reference feature map according to the first processing result feature map, and obtaining an intermediate result feature map by processing the second processing result feature map, a scale of the reference feature map being the same as a scale of the original image, and a scale of the intermediate result feature map being the same as the scale of the original image; and obtaining the target image according to the reference feature map and the intermediate result feature map by using the super-resolution module.

7. The method according to claim 1, wherein performing camera imaging analog adjustment comprises:

performing perspective transformation processing on the first distorted image according to a first perspective transformation parameter to obtain a tilt analog image;

processing the tilt analog image according to an image brightness distribution feature of camera imaging to obtain a brightness analog image;

adding image noise to the brightness analog image to obtain a noise analog image with image noise; and processing the noise analog image according to a preset lighting coefficient to obtain a brightness-darkness analog image.

8. The method according to claim 1, wherein obtaining the moiré pattern training data set further comprises:

displaying original image data on an electronic display screen, and photographing the original image data displayed on the electronic display screen to obtain a training image;

performing feature matching and optical flow alignment processing on the original image data according to the training image, to obtain a supervision image; and constructing a matching image pair based on the training image and the corresponding supervision image.

9. The method according to claim 1, wherein the initial model includes: a multi-band module to be trained, a prediction module to be trained, and a super-resolution module to be trained; and training the initial model comprises:

processing the training image in the matching image pair of the moiré pattern training data set as an input of the initial model by using the initial model, to obtain a first result outputted by the multi-band module, a second result outputted by the prediction module, and a third result outputted by the super-resolution module, the first result including feature maps of N spatial frequency bands corresponding to an N-layer Laplacian pyramid of the training image, the second result including a second result feature map corresponding to the training image, and the third result including a target image corresponding to the training image;

performing N-layer Laplacian pyramid processing on the supervision image in the matching image pair of the moiré pattern training data set to obtain feature maps of N spatial frequency bands corresponding to the supervision image;

obtaining N basic loss function values of the feature maps of the N spatial frequency bands corresponding to the supervision image and the feature maps of the N spatial frequency bands in the first result, obtaining a first loss function value between an image obtained after resolution processing is performed on the supervision image and the second result, and obtaining a second loss function value between the supervision image and the third result; and adjusting model parameters of the initial model according to the N basic loss function values, the first loss function value, and the second loss function value, to obtain the image processing model.

10. The method according to claim 1, wherein training the initial model comprises:

performing size adjustment on images in a target matching image pair of the moiré pattern training data set to obtain P deformed matching image pairs of different sizes; and training the initial model according to the P deformed matching image pairs to obtain P loss function values, and adjusting model parameters of the initial model according to the P loss function values, to obtain the image processing model.

11. The method according to claim 1, wherein the model obtained through training according to each matching image pair in the moiré pattern training data set is used as a first image processing model, and the method further comprises:

performing size enlargement on the training image in the moiré pattern training data set to obtain an enlarged moiré pattern image of a target size;

running the first image processing model to perform moiré pattern removal processing on the enlarged moiré pattern image to obtain a moiré pattern supervision image;

scaling the moiré pattern supervision image and the enlarged moiré pattern image to obtain a plurality of moiré pattern image pairs; and adjusting model parameters of the first image processing model according to the plurality of moiré pattern image pairs to obtain the image processing model.

12. The method according to claim 11, wherein the model obtained by adjusting the model parameters of the first image processing model according to the plurality of moiré pattern image pairs is used as a first version of image processing model;

the first version of image processing model is used as a new first image processing model, to train the new first image processing model according to the moiré pattern training data set to obtain a second version of image processing model;

the image processing model includes: the first version of image processing model and the second version of image processing model; and running the image processing model comprises:

running the first version of image processing model and the second version of image processing model to perform moiré pattern removal processing on the original image to obtain a first image and a second image; and obtaining the target image according to the first image and the second image.

13. An image processing method, performed by an electronic device, the method comprising:

obtaining a moiré pattern training data set, the moiré pattern training data set including matching image pairs, the matching image pair including a training image and a supervision image, wherein the training image has moiré patterns, and the supervision image does not have the moiré patterns;

training an initial model according to each matching image pair in the moiré pattern training data set to obtain an image processing model, wherein the initial model includes a multi-band module to be trained, a prediction module to be trained, and a super-resolution module to be trained, and wherein training the initial model comprises:

processing the training image in the matching image pair of the moiré pattern training data set as an input of the initial model by using the initial model, to obtain a first result outputted by the multi-band module, a second result outputted by the prediction module, and a third result outputted by the super-resolution module, the first result including feature maps of N spatial frequency bands corresponding to an N-layer Laplacian pyramid of the training image, the second result including a second result feature map corresponding to the training image, and the third result including a target image corresponding to the training image, performing N-layer Laplacian pyramid processing on the supervision image in the matching image pair of the moiré pattern training data set to obtain feature maps of N spatial frequency bands corresponding to the supervision image, obtaining N basic loss function values of the feature maps of the N spatial frequency bands corresponding to the supervision image and the feature maps of the N spatial frequency bands in the first result, obtaining a first loss function value between an image obtained after resolution processing is performed on the supervision image and the second result, and obtaining a second loss function value between the supervision image and the third result, and adjusting model parameters of the initial model according to the N basic loss function values, the first loss function value, and the second loss function value, to obtain the image processing model;

obtaining an original image; and running the image processing model to perform moiré pattern removal processing on the original image to obtain a target image, wherein the image processing model includes a multi-band module, the multi-band module being configured to process the original image to obtain an N-layer Laplacian pyramid of the original image, and obtain a first processing result feature map based on feature maps corresponding to N spatial frequency bands of the N-layer Laplacian pyramid, the target image being obtained according to the first processing result feature map, and N being a positive integer greater than or equal to 2.

14. The method according to claim 13, wherein running the image processing model comprises:

running the image processing model to perform M times of initial analysis processing on the original image by using the multi-band module, to obtain initial feature maps in N scales, M being a positive integer greater than or equal to 2, M being greater than or equal to N, and the initial analysis processing comprising:

down-sampling and performing convolution processing on the original image, or performing down-scaled convolution processing on the original image;

performing convolution processing on the initial feature maps in N scales to obtain intermediate feature maps in N scales;

obtaining the feature maps corresponding to the N spatial frequency bands of the N-layer Laplacian pyramid according to the intermediate feature maps in N scales;

obtaining the first processing result feature map according to the feature maps corresponding to the N spatial frequency bands; and obtaining the target image according to the first processing result feature map.

15. The method according to claim 14, wherein in the feature maps corresponding to the N spatial frequency bands, a feature map of an $N^{th}$ spatial frequency band is obtained according to an $N^{th}$ intermediate feature map with a smallest scale in the intermediate feature maps; and in the feature maps corresponding to the N spatial frequency bands, a feature map of an $(N-i)^{th}$ spatial frequency band is obtained according to the $N^{th}$ intermediate feature map, an $(N-i)^{th}$ intermediate feature map, and all intermediate feature maps between the $N^{th}$ intermediate feature map and the $(N-i)^{th}$ intermediate feature map, i being a positive integer greater than or equal to 1 and less than N.

16. The method according to claim 14, wherein obtaining the first processing result feature map comprises:

obtaining a predicted feature map, the predicted feature map being obtained according to an $N^{th}$ intermediate feature map, a $1^{st}$ intermediate feature map, and all intermediate feature maps between the $N^{th}$ intermediate feature map and the $1^{st}$ intermediate feature map;

performing size adjustment on feature maps whose scales are smaller than a scale of the predicted feature map in the feature maps corresponding to the N spatial frequency bands, so that scales of the adjusted feature maps corresponding to the spatial frequency bands are equal to the scale of the predicted feature map; and obtaining the first processing result feature map according to the predicted feature map and the adjusted feature maps corresponding to the spatial frequency bands.

17. The method according to claim 14, wherein the image processing model further includes a prediction module, and obtaining the target image comprises:

obtaining a blurred feature map obtained by blurring the original image;

obtaining a second processing result feature map according to the first processing result feature map and the blurred feature map by using the prediction module; and obtaining the target image according to the second processing result feature map.

18. The method according to claim 17, wherein the image processing model further includes a super-resolution module, and obtaining the target image comprises:

obtaining a reference feature map according to the first processing result feature map, and obtaining an intermediate result feature map by processing the second processing result feature map, a scale of the reference feature map being the same as a scale of the original image, and a scale of the intermediate result feature map being the same as the scale of the original image; and obtaining the target image according to the reference feature map and the intermediate result feature map by using the super-resolution module.

* * * * *